(12) United States Patent
Rimmelspacher et al.

(10) Patent No.: US 11,701,929 B2
(45) Date of Patent: Jul. 18, 2023

(54) TRAILER DEVICE

(71) Applicant: ACPS Automotive GmbH, Ingersheim (DE)

(72) Inventors: Bernhard Rimmelspacher, Rheinstetten (DE); Michael Fischer, Asperg (DE); Aleksej Kadnikov, Leonberg (DE)

(73) Assignee: ACPS AUTOMOTIVE GMBH, Ingersheim (DE)

( * ) Notice: Subject to any disclaimer, the term of this patent is extended or adjusted under 35 U.S.C. 154(b) by 52 days.

(21) Appl. No.: 17/328,397

(22) Filed: May 24, 2021

(65) Prior Publication Data

US 2021/0370729 A1 Dec. 2, 2021

(30) Foreign Application Priority Data

May 27, 2020 (DE) .......................... 102020114230.7

(51) Int. Cl.
*B60D 1/06* (2006.01)
*B60D 1/54* (2006.01)
*B60D 1/24* (2006.01)

(52) U.S. Cl.
CPC ................. *B60D 1/06* (2013.01); *B60D 1/54* (2013.01); *B60D 1/246* (2013.01); *B60D 2001/544* (2013.01)

(58) Field of Classification Search
CPC ............................ B60D 1/54; B60D 2001/544
See application file for complete search history.

(56) References Cited

U.S. PATENT DOCUMENTS

| 7,093,845 | B1 | 8/2006 | Fast |
| 10,717,332 | B2* | 7/2020 | Gentner ................... B60D 1/52 |
| 11,220,145 | B2* | 1/2022 | Rimmelspacher ..... B60D 1/485 |
| 2010/0270774 | A1 | 10/2010 | Boberg et al. |

(Continued)

FOREIGN PATENT DOCUMENTS

| DE | 102011009306 A1 | 7/2012 |
| DE | 102012004999 A1 | 9/2013 |

(Continued)

*Primary Examiner* — Kevin Hurley
(74) *Attorney, Agent, or Firm* — Reinhart Boerner Van Deuren P.C.

(57) ABSTRACT

To improve a trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable by means of its insertion portion into the ball neck receptacle, and a rest position, it is proposed that the trailer device comprises a locking device which fixes the ball neck receiving body in the rest position in a locking state relative to the holding unit and has an unlocking state, in which the locking device allows the ball neck receiving body to pivot from the rest position in the direction towards the working position, and that an actuator is provided, by means of which the locking device is movable from the locking state into the unlocking state.

32 Claims, 24 Drawing Sheets

(56) References Cited

U.S. PATENT DOCUMENTS

| | | | | |
|---|---|---|---|---|
| 2016/0159177 A1* | 6/2016 | Rimmelspacher | ....... | B60D 1/54 |
| | | | | 280/491.3 |
| 2017/0305219 A1* | 10/2017 | Gentner | ................ | B60D 1/485 |
| 2021/0370731 A1* | 12/2021 | Rimmelspacher | ....... | B60D 1/42 |

FOREIGN PATENT DOCUMENTS

| | | | |
|---|---|---|---|
| DE | 102014116000 | A1 | 5/2016 |
| DE | 102016107302 | A1 | 10/2017 |
| DE | 102017109488 | A1 | 11/2018 |
| EP | 1902871 | A1 | 3/2008 |
| EP | 3456555 | A1 | 3/2019 |

* cited by examiner

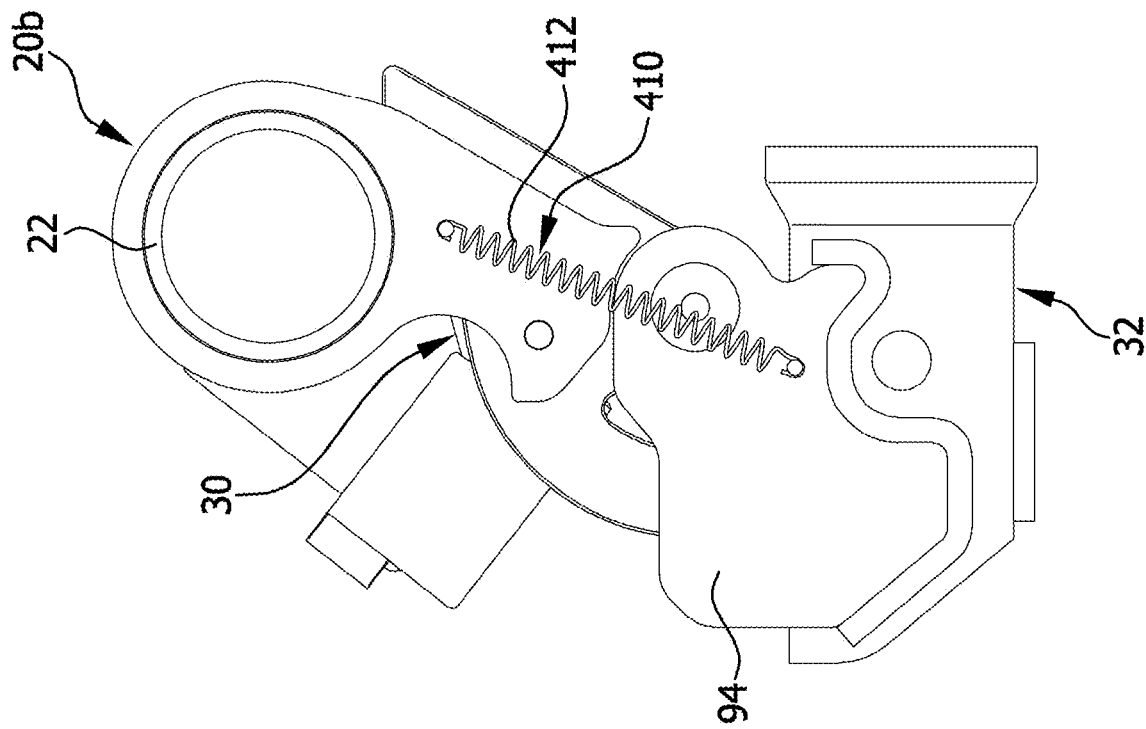
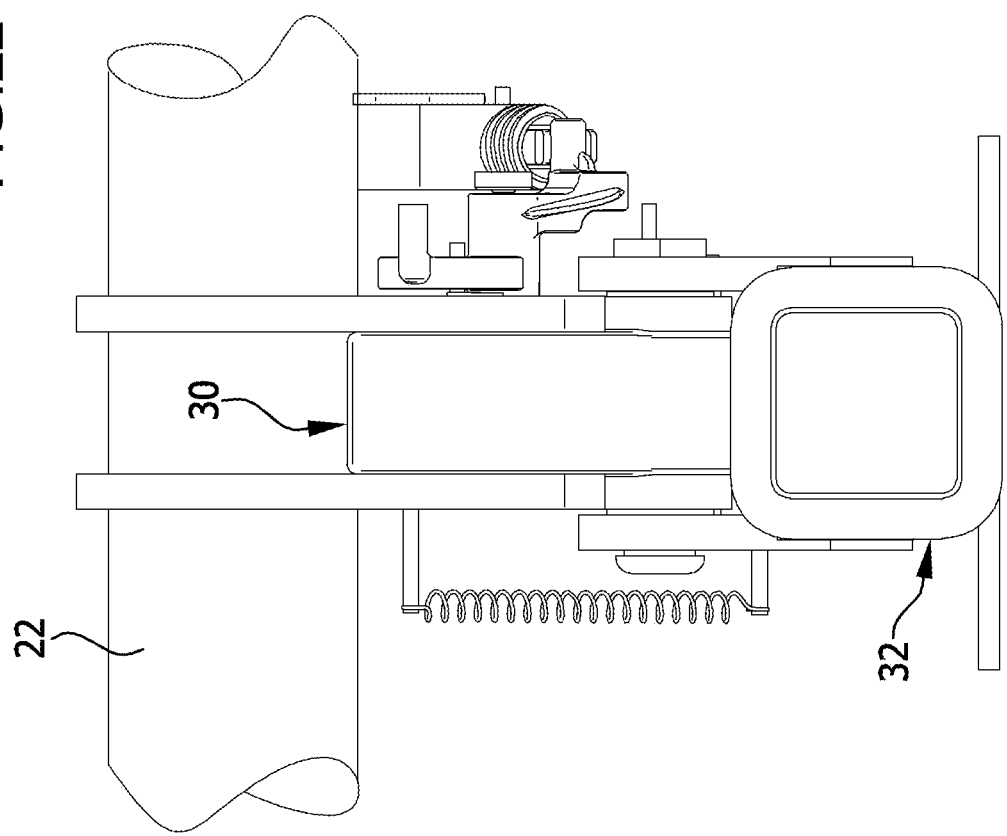
FIG.22

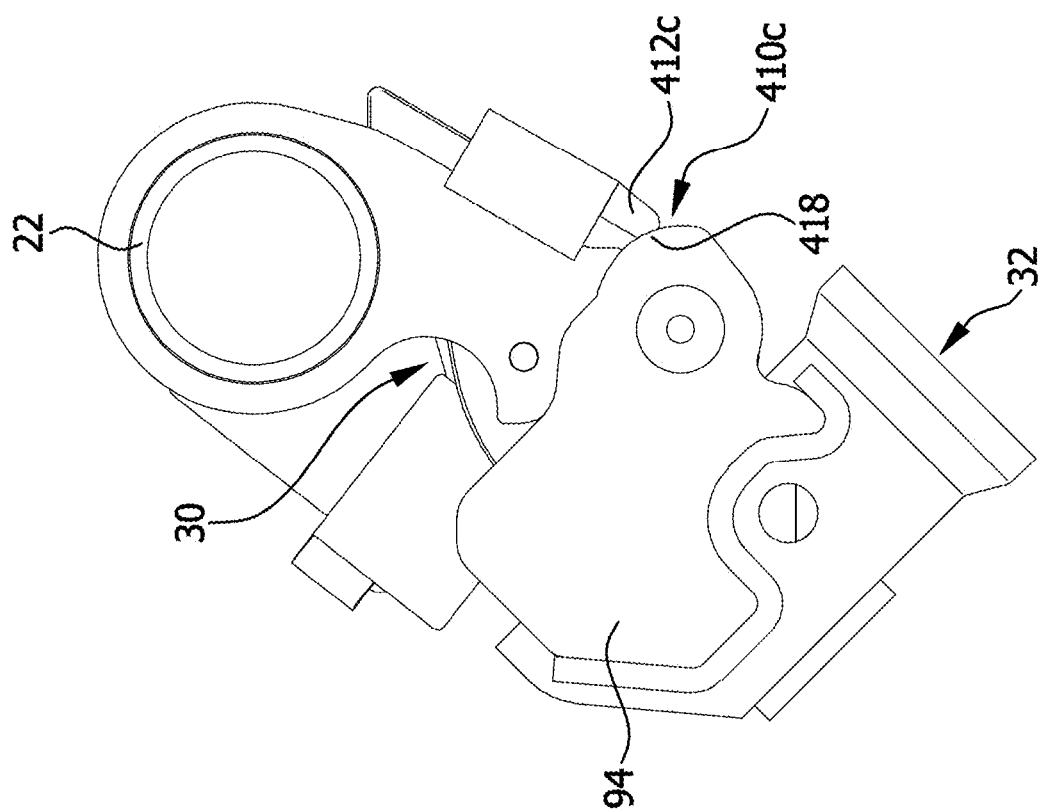
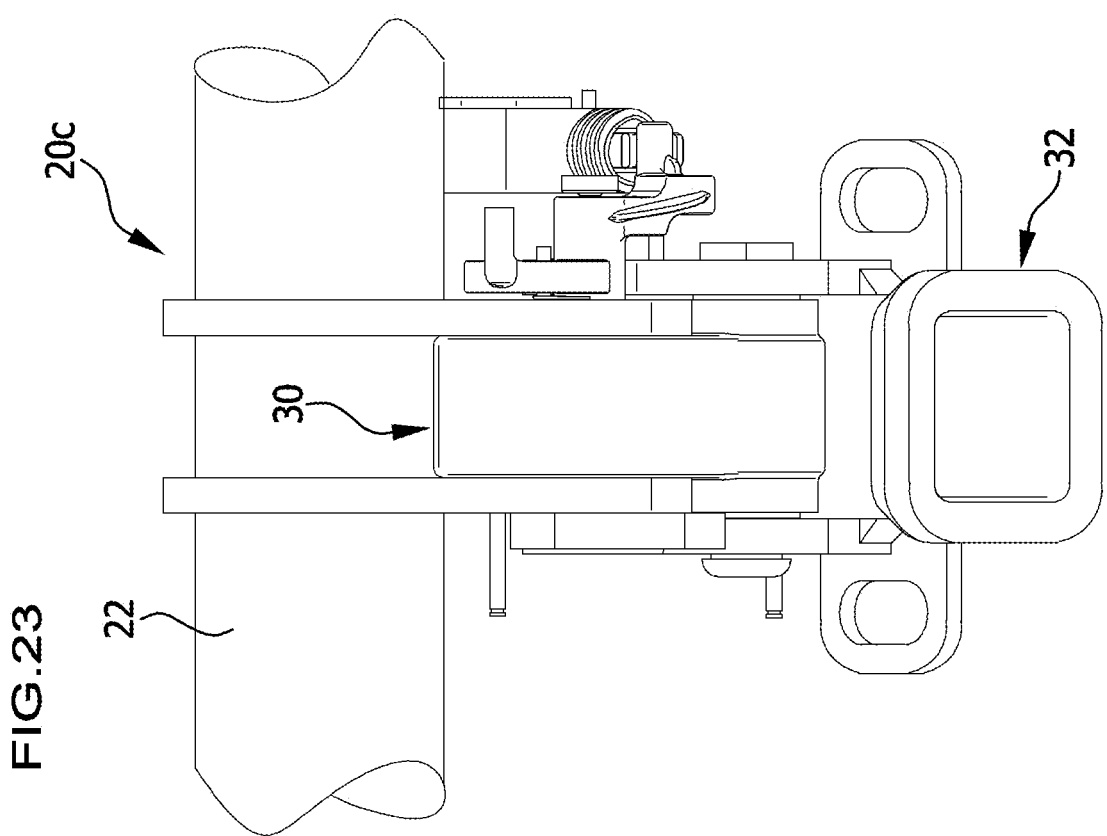
FIG.23

FIG.24
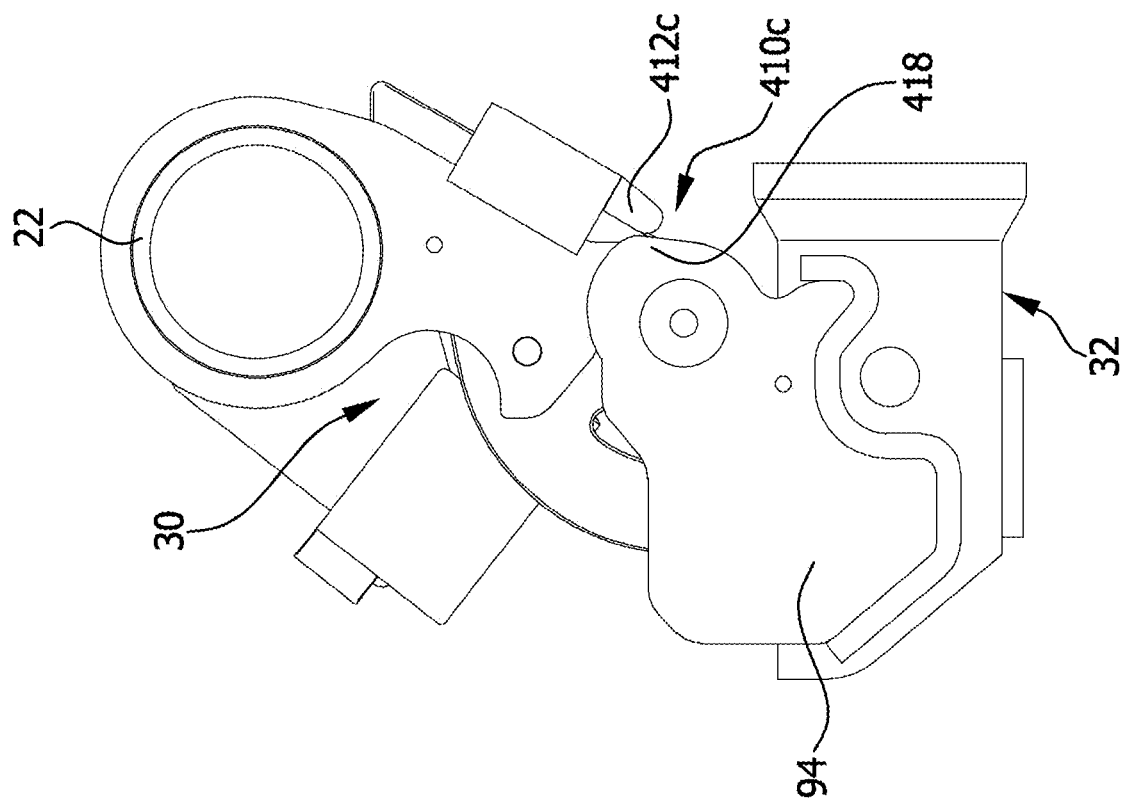
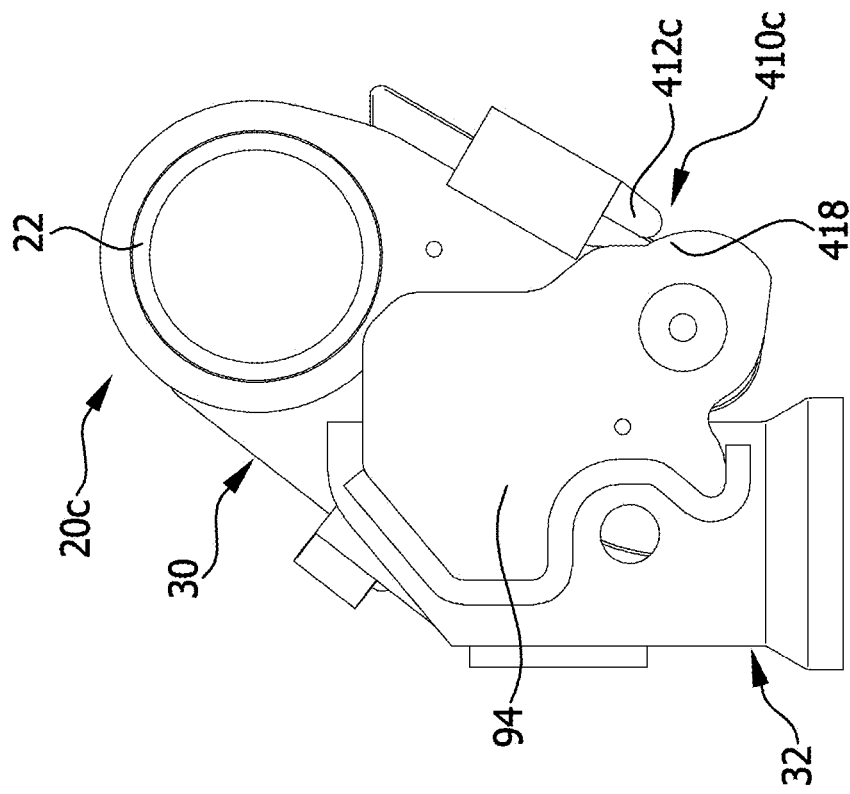

TRAILER DEVICE

CROSS REFERENCE TO RELATED PATENT APPLICATION

This patent application claims the benefit of German application number 10 2020 114 230.7 of 27 May 2020, the teachings and disclosures of which are hereby incorporated by reference thereto in their entirety and for all purposes.

BACKGROUND OF THE INVENTION

The invention relates to a trailer device for motor vehicles. The trailer device comprises a holding unit for a crossmember mountable on a vehicle body on the rear-end side thereof and a ball neck receiving body having a ball neck receptacle, wherein the holding unit is intended for mounting on said ball neck receiving body, and wherein an insertion portion of a ball neck supporting a coupling ball is insertable into the ball neck receptacle and fixable therein. The ball neck receiving body is arranged mounted on the holding unit so as to be pivotable at least between a working position, in which a ball neck is insertable by means of its insertion portion into the ball neck receptacle, and a rest position.

A trailer device is known from the prior art, for example DE 10 2016 107 302 A1.

The problem addressed by the invention lies in improving a trailer device of the type in question.

SUMMARY OF THE INVENTION

In accordance with an embodiment of the invention, this problem is solved by a trailer device of the type described in the introduction, wherein said trailer device comprises a locking device, which, in a locking state, fixes the ball neck receiving body in the rest position relative to the holding unit and has an unlocking state, in which the locking device allows the ball neck receiving body to pivot from the rest position in the direction towards the working position, and wherein an actuator is provided, by means of embodiments of which the locking device is movable from the locking state into the unlocking state.

One of the advantages of the invention is considered, for example, to be that the ball neck receiving body, in the rest position, may be fixed relative to the holding unit by means of the locking device and therefore remains in the rest position until the locking device is moved into the unlocking state, wherein a user of the trailer device can easily effect this movement by means of the actuator.

In particular, the proposed solution with an actuator is also attainable economically.

No further details have been provided previously in respect of the pivoting of the ball neck receiving body from the rest position into the working position.

For example, in some embodiments, a drive is provided in order to pivot the ball neck receiving body.

However, it is particularly advantageous if the ball neck receiving body, at least in the rest position, is loaded by force in the direction towards the working position. In particular, it is hereby possible for the ball neck receiving body to be pivoted immediately, as a result of the loading with force, in the direction towards the working position when the locking device moves into the unlocking state.

It is expedient here if the loading with force is effective until the ball neck receiving body at least approximately reaches the working position.

For example, in some embodiments, a device exerting a force onto the ball neck receiving body, for example a spring, is provided for the force loading of the ball neck receiving body.

It is particularly advantageous, however, if the trailer device is constructed in such a way that, at least in an operating state, the ball neck receiving body is force-loaded by the effect of the force of gravity in the direction towards the working position, in particular until at least approximately in the working position. In particular, the loading is hereby realized in a structurally simple manner, without the need for further elements for this loading.

In the foregoing and hereinafter, an operating state shall be understood in particular to mean that the trailer device is mounted correctly on a motor vehicle, and in particular the motor vehicle is on an at least approximately horizontal road surface.

In preferred embodiments, it is provided that the ball neck receiving body is movable by hand from the working position into the rest position, and in particular is to be moved against the force loading, that is to say in particular is constructed and configured in such a way that a user must move the ball neck receiving body manually into the rest position.

No further details have been provided previously in respect of the locking device.

In particular, the locking device in the locking state has at least one locking position, for example a plurality of locking positions, and in the unlocking state has at least one unlocking position, for example a plurality of unlocking positions.

In the foregoing and hereinafter, the wording "in at least one unlocking position" and "in at least one locking position" in conjunction with a feature shall be understood to mean, in particular, that this feature, preferably in combination with further features, is realized in the one unlocking position and in the one locking position respectively or in one, preferably in a plurality, for example in all of the plurality of unlocking positions and the plurality of locking positions respectively.

The locking device expediently comprises two locking components, which in particular in the locking state interact with one another in a locking manner and for example in the locking state limit a relative movement in relation to one another and/or fix their relative position in relation to one another, so that the ball neck receiving body is advantageously also fixed relative to the holding unit. In at least one unlocking position of the unlocking state, the two locking components are detached from one another and in particular are movable in relation to one another substantially freely, so that the ball neck receiving body is advantageously also movable from the rest position into the working position.

In particular, it is provided that the locking device comprises a locking component associated with the holding unit and a locking component associated with the ball neck receiving body.

It is particularly expedient if the locking component associated with the holding unit is fixedly connected to the holding unit and the locking component associated with the ball neck receiving body is fixedly connected to the ball neck receiving body. For example, the fixed connection of the associated locking components results in a reliable locking and a stable structural configuration.

In advantageous embodiments, the locking device comprises a locking component having a locking bar body receptacle and a locking component having a locking bar, wherein, at least in a locking position of the locking state, the locking bar body is received in the locking bar body receptacle. In particular, the locking bar body receptacle and the locking bar body received therein define the relative positions of their respective locking components in relation to one another.

In particular, a locking component comprises a locking bar body receiving element having the locking bar body receptacle.

The locking bar body receiving element is preferably mounted movably, in particular pivotably, in its locking component, so that movement between different locking positions and unlocking positions is advantageously possible in a structurally simple way.

It is particularly expedient if the locking device comprises at least one locking component, which is loaded, in particular loaded by force, in the direction towards the locking state. For example, it is hereby achieved that the locking device is basically in the locking state and is only moved into the unlocking state in order to release the ball neck receiving body in the event of actuation of the actuator.

For example, the loaded locking component is spring-loaded.

In particular, it is provided that the loaded locking component has the locking bar body receptacle and/or is the locking component associated with the holding unit.

It is particularly expedient if, as the ball neck receiving body is moved into the rest position, the locking device is moved into the locking state, and therefore preferably also provides the locking effect without further action as the ball neck receiving body is moved into the rest position.

In particular, the ball neck receiving body, when moved into the rest position, acts on the locking device and moves it into the locking state.

In particular, as the ball neck receiving body is moved into the rest position, the locking component associated with the ball neck receiving body acts on the locking component associated with the holding unit to move the locking device into the locking state. For example, the pivotable locking component, in particular the movable locking bar body receiving element, as the ball neck receiving body is moved into the rest position, moves at least briefly from a locking position in order to bring both locking components into at least one locking position, in which these then interact lockingly.

No further details have been provided previously in respect of the actuator.

In particular, the actuator comprises an actuator drive and an operative actuator element. The operative actuator element may therefore expediently be moved by means of the actuator drive of the actuator and acts on the locking device in order to move it into the unlocking state.

In accordance with the invention, a very wide range of actuator drives may be provided for this purpose.

For example, the actuator drive is a mechanical drive.

In some advantageous embodiments, it is provided that the actuator drive is an electromagnetic drive.

In particular, the actuator drive comprises a solenoid.

In some advantageous embodiments, the actuator drive has a linear drive, for example in order to act on the locking device in a structurally simple way.

In other preferred embodiments, it is provided that the actuator drive comprises a rotary drive, thus providing an economical solution, for example.

It is particularly expedient if the actuator drive composes a rack and pinion drive, in which case, for example, a rotary movement effected by a motor is converted into an effective linear movement of the actuator.

It is preferred if the actuator drive is not self-locking, that is to say in particular is moved into a starting position when not energized.

The actuator drive is preferably loaded in its starting position, for example by means of an elastic energy store, which in particular exerts a pulling or pushing force on the actuator drive.

In particular, when actuated, the actuator is moved in a preferably linear direction from the starting position and, after the actuation, is moved into the starting position as a result of being loaded, for example by the elastic energy store.

In some advantageous embodiments, the actuator exerts a pulling force on the locking device.

In other particularly advantageous embodiments, it is provided that the actuator exerts a pushing force on the locking device.

In particular, it is provided that the actuator acts on one of the locking components for example by means of the operative actuator element.

In some embodiments, it is provided that the actuator acts on the locking component associated with the ball neck receiving body.

In other preferred embodiments, it is provided that the actuator acts on the locking component associated with the holding unit, whereby in particular a coupling therebetween is simple, since, during operation of the trailer device, the holding unit and the locking component associated therewith and also the actuator are substantially stationary in relation to one another.

In particular, the actuator and the locking device are coupled to one another by means of a coupling arrangement, wherein the coupling arrangement in particular comprises a coupling component associated with the actuator and a coupling component associated with the locking device.

For example, in some embodiments, an electric and/or magnetic coupling arrangement is provided.

In some advantageous embodiments, the coupling arrangement is mechanical.

The actuator preferably acts on the locking device with a linear movement, in particular by means of the coupling arrangement.

In particularly preferred embodiments, it is provided that the coupling arrangement converts the linear movement of the actuator into a pivoting movement of an element of the locking device, this element being the locking bar receiving element, for example.

It is particularly expedient, in particular for the above-explained conversion of the linear movement into a pivoting movement, if the coupling component associated with the actuator and the coupling component associated with the locking device are connected rotatably to one another.

In particular, the coupling in the coupling arrangement is achieved by elements connected to one another in a positive-locking manner.

In some advantageous embodiments, it is provided that the actuator is coupled directly to the locking device. A component-saving and economical solution is hereby preferably provided and may be less susceptible to faults as a result of the direct effect. In particular, elements of the actuator and of the locking device in this case form the coupling arrangement, and in particular therefore form coupling components.

The operative actuator element preferably acts directly on one of the locking components, for example part of the locking bar receiving element.

It is particularly expedient if the operative actuator element is one of the elements of the coupling arrangement connected in a positive-locking manner.

It is preferably provided that one of the elements of the coupling arrangement connected in a positive-locking manner is arranged directly on the locking bar body receiving element and in particular is connected thereto in a force-locking manner, positive-locking manner and/or with a substance-to-substance bond, or that one of the elements connected in a positive-locking manner is formed by the locking bar body receiving element.

In some expedient embodiments, it is provided that the coupling arrangement is coupled between the actuator and the locking device.

In particular, the coupling device may hereby be constructed for a particularly expedient coupling, and, for example, a more flexible arrangement of the actuator and the locking device in a predefined installation situation is made possible by the coupling arrangement arranged in between.

For example, the coupling arrangement, which in particular is coupled in between, comprises at least one redirection member, by means of which a movement, in particular linear movement, of the actuator element effected by the actuator is redirected in an effective actuator direction into a movement transferred to the locking device in an unlocking and/or locking direction. The actuator and the locking device may preferably hereby be constructed for their specific functions and may be arranged independently of one another at preferred points.

In particular, the coupling arrangement comprises at least one rigid redirection member, which for example offers a stable implementation for the redirection of the movement direction, it is particularly expedient if the rigid redirection member is mounted in the coupling arrangement so as to be movable at least between a position corresponding to the locking state and a position corresponding to the unlocking state.

In particularly preferred embodiments, it is provided that the coupling arrangement, which in particular is coupled in between, comprises at least one flexible redirection member, wherein this in particular is bendable and/or elastic, whereby a reliable transfer of force and movement from the actuator to the locking device in a manner adapted flexibly to the installation situation can preferably be achieved.

In particular, the actuator exerts a pulling force, conveyed by means of the flexible redirection member, onto the locking device and preferably exerts a bias, against the action of the tension of the actuator, onto the locking device, in particular moving the latter into the locking state. It is hereby advantageously achieved that the flexible redirection member is always placed under tension, and a reliable transfer of effect and force is achieved.

No further details have been provided previously in respect of further embodiments.

It is preferably provided that the ball neck receiving body is mounted pivotably in such a way that, when a locking device is moved into the unlocking state, the ball neck receiving body at least normally moves from the rest position in the direction towards the working position and in particular until at feast approximately in the working position. This is implemented in particular without any action on the part of the user, such that a user must merely actuate the actuator in order to move the ball neck receiving body into the working position.

In the foregoing and hereinafter, the expression "at least normally" shall be understood in particular to mean that a device is constructed for operation as explained in conjunction with this expression, and that, with correct installation, this operation is satisfied as long as this is not prevented by an undesirable external influence, for example deliberate and/or caused by wear and/or soiling.

The ball neck receiving body preferably moves, as a result of the loading with force, in the direction towards the working position and in particular until at least approximately in the working position.

It is particularly advantageous if an initial element is provided for the trailer device, which initial element, in at least an unlocking position in the unlocking state, in the event of actuation of the actuator effects an initial impulse in the direction towards the working position on the ball neck receiving body positioned in the rest position. In particular, the ball neck receiving body is hereby acted on in order to overcome a state of being stuck in the rest position, for example as a result of soiling and/or wear, and in order to move in the direction towards the working position.

It is particularly expedient if, in the unlocking state, the initial element has at least a first unlocking position, in which the initial element does not act on the ball neck receiving body positioned in the rest position, and at least a second unlocking position, in which the initial element acts indirectly or directly, in particular with force, on the ball neck receiving body positioned in the rest position. In particular, when the actuator is actuated, the locking device is moved by the actuator firstly into the first unlocking position and then into the second unlocking position, and in so doing the ball neck receiving body is also moved, with the movement from the first unlocking position into the second unlocking position, as a result of the action of the initial element, from the rest position in the direction towards the working position and therefore the movement of the ball neck receiving body in the direction towards the working position is at least assisted.

For example, the initial element is connected directly to the actuator.

In expedient embodiments, the locking device comprises the initial element. It is particularly advantageous if the locking component associated with the holding unit and/or the locking component having a pivotable locking bar element comprises the initial element. For example, a stable arrangement of the initial element and/or a utilization of the pivoting movement of the locking bar element is hereby achieved.

Alternatively or additionally, the above-mentioned invention is also achieved in that the trailer device comprises a damping device to at least partially damp a movement of the ball neck receiving body into the working position. The ball neck receiving body preferably hereby passes in a slowed manner into the working position, so that an abrupt ending of the movement in the working position can be avoided and therefore associated damaging impacts and/or noises can at least be reduced.

For example, the damping device acts on the ball neck receiving body at least in the working position and/or just before the working position is reached.

It is particularly expedient if the damping device damps the movement of the ball neck receiving body at least during a last part of the movement of the ball neck receiving body from the rest position into the working position, for example at least in a last third of this movement.

It is particularly expedient if the damping device, in the rest position of the ball neck receiving body, does not act in a damping manner on said body, so that the ball neck receiving body can leave the rest position without being hindered, at feast by the damping device.

It is particularly advantageous if the damping effect of the damping device on the movement of the ball neck receiving body is initiated once the rest position has been left, but before the working position is reached.

In particular, in the event of a partial movement occurring as the ball neck receiving body starts to move from the rest position into the working position, said partial movement corresponding for example at least approximately to a first third of the total movement, the damping device does not damp this movement of the ball neck receiving body.

It is particularly advantageous if, at least during part of the movement of the ball neck receiving body from the rest position into the working position, the damping effect of the damping device becomes greater as the ball neck receiving body approaches the working position, so that in particular the ball neck receiving body passes into the working position initially with minimal hindrance and then in a braked manner.

In some advantageous embodiments, the damping effect of the damping device is greatest in the working position of the ball neck receiving body.

In other preferred embodiments, the damping effect of the damping device decreases at least shortly before the ball neck receiving body moving from the direction towards the rest position reaches the working position. For example, the ball neck receiving body is hereby held at least a little in the working position, since the damping effect increases from the working position in the direction towards the rest position.

In some expedient embodiments, the damping device comprises an elastic damping element, in particular for absorbing kinetic energy of the movement of the ball neck receiving body.

No further details have been provided previously in respect of further embodiments of the actuator.

It is particularly expedient if the actuator comprises an actuation arrangement for actuating the actuator drive.

In some embodiments, the actuation arrangement, when actuated, acts mechanically on the actuator drive.

In preferred embodiments, it is provided that the actuation arrangement, when actuated, sends an electrical actuation signal to the actuator drive. For example, a reliable and economical connection between the actuation arrangement and the actuator drive can hereby be realised.

In some advantageous embodiments, it is provided that the electrical actuation signals are sent by cable from the actuation arrangement to the actuator drive, that is to say in particular the actuation arrangement and the actuator drive are connected by means of a cable for signal transmission.

In other preferred embodiments, it is provided that the electrical actuation signals are sent wirelessly from the actuation arrangement the actuator drive, that is to say in particular the actuation arrangement and the actuator drive are constructed to send and to receive actuation signals by means of a wireless connection. For example, in this case the actuation arrangement is constructed as a remote controller or is integrated into a portable, mobile communications apparatus, thus providing a user-friendly solution for simple actuation of the actuator.

In some expedient embodiments, it is provided that, in the event of one-time actuation of the actuation arrangement, for example an Individual actuation impulse is sent to the actuator drive and the actuation arrangement of the actuator drive moves into a predefined end position, in particular independently of the duration of the actuation.

In other advantageous embodiments, it is provided that the actuator drive receives an actuation signal as long as the actuation arrangement is actuated. In particular, the actuator drive is driven depending on the duration of actuation of the actuation arrangement.

The actuator drive is preferably driven as long as the actuation arrangement is actuated, but at most until a predefined end position is reached.

No further details have been provided previously in respect of the arrangement of the actuator and further parts of the trailer device.

For example, the holding unit is intended to be attached to a crossmember.

In particular, it is provided that the trailer device also comprises the crossmember.

In particular, the actuator comprises an actuator housing, in which in particular at least the majority of the parts of the actuator, for example at least the actuator drive, are arranged and for example are therefore protected against external influences.

In some expedient embodiments, it is provided that the actuator, at least in part, in particular at least with its actuator housing and/or with its actuator drive, is arranged on the holding unit, thus allowing a compact construction to be realized.

In other advantageous embodiments, it is provided that the actuator, at least in part, in particular with its actuator housing and/or with its actuator drive, is arranged on the crossmember, for example in order to utilize a free area of installation space provided there.

In some advantageous embodiments, the actuation arrangement is arranged directly on the actuator drive, so that these can be connected to one another in a structurally simple way.

For example, the actuation arrangement, with a housing thereof and in particular with a button for actuation, is arranged directly next to the actuator housing or integrated in the actuator, for example arranged in the actuator housing.

In other advantageous embodiments it is provided that the actuation arrangement is arranged at a spacing from the actuator drive, in particular at a point easily reached by a user.

For example, the actuation arrangement, in particular with a housing thereof and for example with a button for actuation, is arranged on the holding unit.

In other advantageous embodiments, the actuation arrangement, in particular with its housing and for example with a button for actuation, is arranged on the crossmember.

No detailed information has been provided previously in respect of the pivotable arrangement of the ball neck receiving body on the holding unit.

It is preferably provided that the ball neck receiving body is arranged on the holding unit so as to be freely pivotable relative to the holding unit between the working position and the rest position, so that in particular the holding unit does not hinder at least the pivotability of the ball neck receiving body between the rest position and the working position, and preferably also no other elements and/or devices hinder this free pivotability at least normally and in an operating state, apart from the locking device in the locking state, and for example a device for fixing the ball neck receiving body in the working position in trailer operation. In particular a stop element cooperating with an inserted insertion portion.

It is particularly advantageous if the ball neck receiving body is loaded by the force of gravity in the direction towards the working position as a result of the pivotable arrangement of the ball neck receiving body on the holding unit.

In particular, in some embodiments, the pivotable arrangement is therefore constructed such that, at least in an operating state and without any effect of the locking device and the locking state, the ball neck receiving body would always be moved at least approximately into the working position by the loading with a force, for example effected by the force of gravity.

No further details have been provided previously in respect of the arrangement of the ball neck receiving body in the rest position.

In particular, it is provided that the trailer device is constructed in such a way that, at least in an operating state, a center axis of the ball neck receptacle in the rest position runs at least approximately vertically.

In particular, the insertion portion is insertable and is to be inserted into the ball neck receptacle at least approximately in a direction axial to the center axis.

In particular, it is advantageous if, at least in an operating state, the ball neck receiving body in the rest position is arranged higher than in the working position based on the direction of the force of gravity.

In particular, it is provided that the ball neck receiving body is arranged pivotably on the holding unit in such a way that, in the rest position, the ball neck receiving body is arranged substantially in front of the pivot axis, wherein the orientation in front of the pivot axis shall be understood insofar as, when a trailer device is installed correctly on a motor vehicle, the ball neck receiving body in the rest position is arranged in front of the pivot axis based on the direction of forward travel of the motor vehicle, for example so as to be able to place the ball neck receiving body in the rest position in a space-saving manner and outside a field of view.

It is furthermore advantageously provided that, at least in an operating state, in the rest position the insertion opening of the ball neck receiving body substantially faces the road surface and/or an end region of the ball neck receiving body forming the insertion opening is a lowest region of the ball neck receiving body based on the direction of the force of gravity.

In particular, it is provided that, at feast in an operating state, the ball neck receding body in the rest position is arranged on a side of the pivot axis facing the vehicle body, in particular a rear-end region of the vehicle body.

For example, the ball neck receiving body in the rest position is arranged in a receiving space of the holding unit, wherein the receiving space lies in particular between two side parts of the holding unit by means of which the holding unit is attachable or is attached to a crossmember.

No further specific details have been provided previously in respect of the arrangement of the ball neck receiving body in the working position.

In particular, it is provided that, at least in an operating state, the ball neck receiving body in the working position is arranged beneath the pivot axis based on the direction of the force of gravity.

It is particularly expedient if, at feast in an operating state, the ball neck receiving body in the working position is arranged beneath a plane defined by a lower edge of a bumper unit of the motor vehicle and parallel to the road surface, based on the direction of the force of gravity.

In particular, at least in an operating state, a center axis of the ball neck receiving body in the working position runs at least approximately parallel to a plane through the road surface, that is to say, in the case of a horizontal road surface, the center axis runs at least approximately horizontally.

No detailed information has been provided previously in respect of the specific embodiment of the pivotable arrangement of the ball neck receiving body on the holding unit.

In particular, the ball neck receiving body is mounted pivotably about a pivot axis between the working position and the rest position and vice versa.

In this case, the pivot angle through which the ball neck receiving body is to be pivoted starting from the rest position to the working position and vice versa, (n particular about the pivot axis, is for example at least 45°, preferably at least 60°, and/or in particular at most 140°, expediently at most 120°. It is particularly preferred if the pivot angle is at least approximately 90°.

In particular, in at least one operating state, the pivot axis runs at least approximately perpendicularly to a longitudinal direction of the vehicle.

It is preferably provided that the pivot axis runs at least approximately parallel to a longitudinal extent of the crossmember.

The ball neck receiving body is preferably pivotable in particular relative to the holding unit and for example relative to the crossmember about only one single pivot axis.

In particular, a pivot bearing unit is provided for the pivotable arrangement of the ball neck receiving body.

In particular, the pivot bearing unit comprises a bearing pin, which in particular by means of its longitudinal extent defines the pivot axis about which the ball neck receiving body is pivotable.

In particular, the ball neck receiving body is arranged on the bearing pin so as to be pivotable about the pivot axis, in particular by means of bearing elements, wherein the bearing elements are connected to the ball neck receiving body or form parts of the ball neck receiving body of the bearing elements.

In particular, the pivot bearing unit comprises a pin support, on which the bearing pin is for example mounted rotatably or fixedly arranged. In particular, the bearing pin is arranged in a through opening of the pin support.

For example, the pin support is arranged between two side parts by means of which the holding unit is attachable or attached to a crossmember and is fixedly connected to said side parts, or in other embodiments the side parts themselves form the pin support.

No further details have been provided previously in respect of a fixing of an inserted insertion portion of a ball neck in the ball neck receptacle of the ball neck receiving body.

Different solutions can be provided in order to fix the insertion portion.

In particular, the ball neck receptacle has one or more lateral transverse walls, which preferably is/are formed at least in part in a planar manner and by means of which the insertion portion is fixed in particular non-rotatably in the ball neck receptacle.

In particular, the ball neck receiving body has a fixing device for fixing the insertion portion at least in the insertion direction, wherein this fixing device is formed for example by through openings in the ball neck receiving body and by a fixing pin as well as by a corresponding through opening in the insertion portion, and the fixing is achieved by arranging the fixing pin in the through openings.

No further details have been provided previously in respect of a fixing of the ball neck receiving body and an insertion portion of a ball neck received in the ball neck receptacle of said ball neck receiving body.

A very wide range of different solutions can be provided for this purpose.

At least one stop element is preferably provided, by means of which, in cooperation with an insertion portion of a ball neck inserted into the ball neck receptacle, the ball neck receiving body together with the insertion portion is fixed non-rotatably in at least one pivot direction about the pivot axis. Here, the at least one stop element or the plurality of stop elements are in particular constructed to be stable enough to sufficiently firmly fix the insertion portion of the ball neck non-rotatably together with the ball neck receiving body for trailer operation.

It is particularly expedient if the at least one stop element is fixedly connected to the holding unit, for example by means of a stop support.

In particular, at least in one operating state, the at least one stop element is arranged on a side of the pivot axis facing the rear-end side of the motor vehicle.

In particular, a stop element is provided for each of the two opposite directions of rotation about the pivot axis.

In particular, a stop element which blocks a pivot movement about the pivot axis from the working position in the direction towards the rest position cooperates with the insertion portion in the ball neck receptacle so that, in particular when the insertion portion is inserted, the pivoting of the ball neck receiving body together with the insertion portion is blocked, but pivoting of the ball neck receiving body in the direction towards the rest position is enabled when the insertion portion is removed.

It is preferably provided that at least one stop element, in particular the one that blocks a pivot movement from the working position in the direction towards the rest position, engages through an opening of the ball neck receiving body at least in the working position. For example, cooperation between the stop element and the inserted insertion portion is hereby made possible in a structurally simple way.

It is particularly expedient if at feast one stop element, in particular the one that blocks a pivot movement from the working position in the direction towards the rest position, forms a support surface, against which an insertion portion of a ball neck inserted into the ball neck receptacle abuts in the working position of the ball neck receiving body, thus blocking a pivoting of the ball neck receiving body together with the inserted insertion portion in at least one pivot direction, in particular in the pivot direction towards the rest position. In particular, the support surface is arranged here substantially in the through opening of the ball neck receiving body.

It is particularly advantageous if the support surface in the working position forms at least a portion of an inner transverse wall surface of the ball neck receptacle, for example in the region of the openings of the ball neck receiving body, and thus blocks a pivoting of the inserted insertion portion together with the ball neck receiving body.

In particular, the support surface in the working position runs at least approximately parallel to the center axis of the ball neck receiving body.

For example, the support surface in at least one operating state in the working position runs at least approximately parallel to the road surface.

In particular, the support surface runs at least approximately parallel to the pivot axis and in particular at least in one operating state approximately perpendicularly to a vertical through the pivot axis.

The support surface at least in one operating state is preferably arranged on a side of the vertical through the pivot axis facing the rear-end side of a motor vehicle.

It is particularly advantageous if the at least one stop element in the rest position engages in the ball neck receptacle, whereby a space-saving construction is advantageously made possible. In particular, in this case, the stop support engages through the opening in the ball neck receiving body.

In particular. It is provided that the trailer devices constructed in such a way that the support surface of the at least one stop element in the rest position runs at least approximately perpendicularly to the center axis of the ball neck receptacle.

A pivot stop is preferably fixedly arranged on the ball neck receiving body and, together with an end stop arranged fixedly on the holding unit, in the working position counteracts a pivoting of the ball neck receiving body from the working position in a pivot direction opposite the direction towards the rest position and blocks this rotary movement.

In particular, the holding unit has a stop element which forms the end stop.

For example, this stop element is a further stop element of the holding unit.

It is particularly preferable, however, if the at feast one stop element, which together with the inserted insertion portion locks a pivoting in the direction towards the rest position, also forms the end stop.

In particular, the end stop is arranged here on a side of the stop element opposite the support surface.

In some embodiments, the stop element forming the end stop is arranged laterally on the holding unit, with reference to the pivot axis.

In preferred embodiments, the stop element forming the end stop is arranged in at least one operating state on the holding unit on a side of the pivot axis facing the rear-end side of the motor vehicle.

In particular, the stop support is arranged between the pivot axis and the pivot stop.

In particular, a side of the stop support facing the pivot stop is constructed in such a way that, as the ball neck receiving body is pivoted from the rest position into the working position and vice versa, the pivot stop is entrained unhindered along this side by the ball neck receiving body.

Particularly expedient implementations of a trailer device with a ball neck receiving body which can be pivoted between a working position and a rest position about in particular precisely one pivot axis and which can be fixed in the working position are the subject of document DE 10 2016 107 302 A1, and reference is made to the full content of this document in particular with regard to preferred implementations of the pivot bearing unit, the positioning of the ball neck receiving body in the rest position and working position, and the constructions of the ball neck receiving body and also with the holding unit and further advantageous constructions of the trailer device.

No further details have been provided previously in respect of further advantageous embodiments of the trailer device.

The problem forming the basis of the invention is also solved alternatively or in addition in that the trailer device comprises a sensor which is constructed to detect whether a ball neck is inserted by means of its insertion portion in the ball neck receptacle of the ball neck receiving body positioned in the working position at least over a minimal extent necessary to fix the ball neck in the ball neck receptacle. Therefore, the sensor can thus expediently detect whether the insertion portion is received in the ball neck receptacle at least over the necessary minimal extent, and for example it is possible to display to the user that he has inserted the insertion portion sufficiently far.

In particular, it is provided that the at least one insertion portion inserted over the minimal extent at least contributes to a blocking of the pivoting of the ball neck receiving body from the working position in at least one pivot direction, in particular at least in the direction towards the rest position.

The insertion portion inserted at least over the minimal extent preferably cooperates with the at least one stop element to fix the ball neck receiving body non-rotatably.

It is particularly advantageous if the insertion portion inserted at least over the minimal extent contacts the support surface of the at least one stop element at least partially, for example over the entire area.

It is particularly expedient if the insertion portion inserted at least over the minimal extent is inserted far enough for fixing in at least one insertion device by means of the fixing device.

For example, the through opening in the insertion portion inserted over the minimal extent Is at least arranged aligned with the corresponding through openings in the ball neck receiving body to such an extent that a fixing pin for fixing can be inserted through said openings.

It is particularly advantageous if the sensor is arranged behind the at least one stop element, based on the direction of insertion of the insertion portion into the ball neck receptacle. In particular, the sensor hereby detects whether the insertion portion is inserted in the ball neck receptacle at least beyond the stop element and in particular whether the inserted insertion portion thus reliably cooperates with the stop element so as to block a pivoting of the ball neck receiving body.

For example, the sensor is an optical sensor.

In other advantageous embodiments, the sensor is a magnetic, in particular inductive sensor.

In some expedient embodiments, the sensor is constructed as a contact sensor.

Alternatively or additionally, the problem addressed by the invention is also solved by a motor vehicle which has a trailer device having at least one or a combination of a plurality of the above-explained features.

In particular, the advantages described here in conjunction with the above-explained features can be transferred also to the motor vehicle.

In the foregoing and hereinafter, the expression "at least approximately" shall be understood in conjunction with a detail to mean that deviations from the detail that are considered to be technically irrelevant or that result for technical reasons are also included. For example, deviations by ±20%, in particular of ±10%, for example of ±5% from the detail are also included. In the case of directional details, in particular deviations by up to ⌞20°, preferably of up to ±10°, for example of up to ±5° are also included.

The above description of solutions according to the invention therefore in particular comprises the various combinations of features defined by the consecutively numbered embodiments below:

Further preferred embodiments and advantages of the invention are the subject of a number of embodiment examples shown in the drawing and explained hereinafter.

BRIEF DESCRIPTION OF THE DRAWINGS

In the drawing:

FIG. 22 shows a front view and a side representation of a further embodiment example of a trailer device with a damping device comprising a spring;

FIG. 23 shows a front view and a side representation of a further embodiment example of a trailer device with a damping device comprising a rubber element; and FIG. 24 shows two further side representations of the embodiment example with a damping device comprising a rubber element.

DETAILED DESCRIPTION OF THE INVENTION

Figure 1:
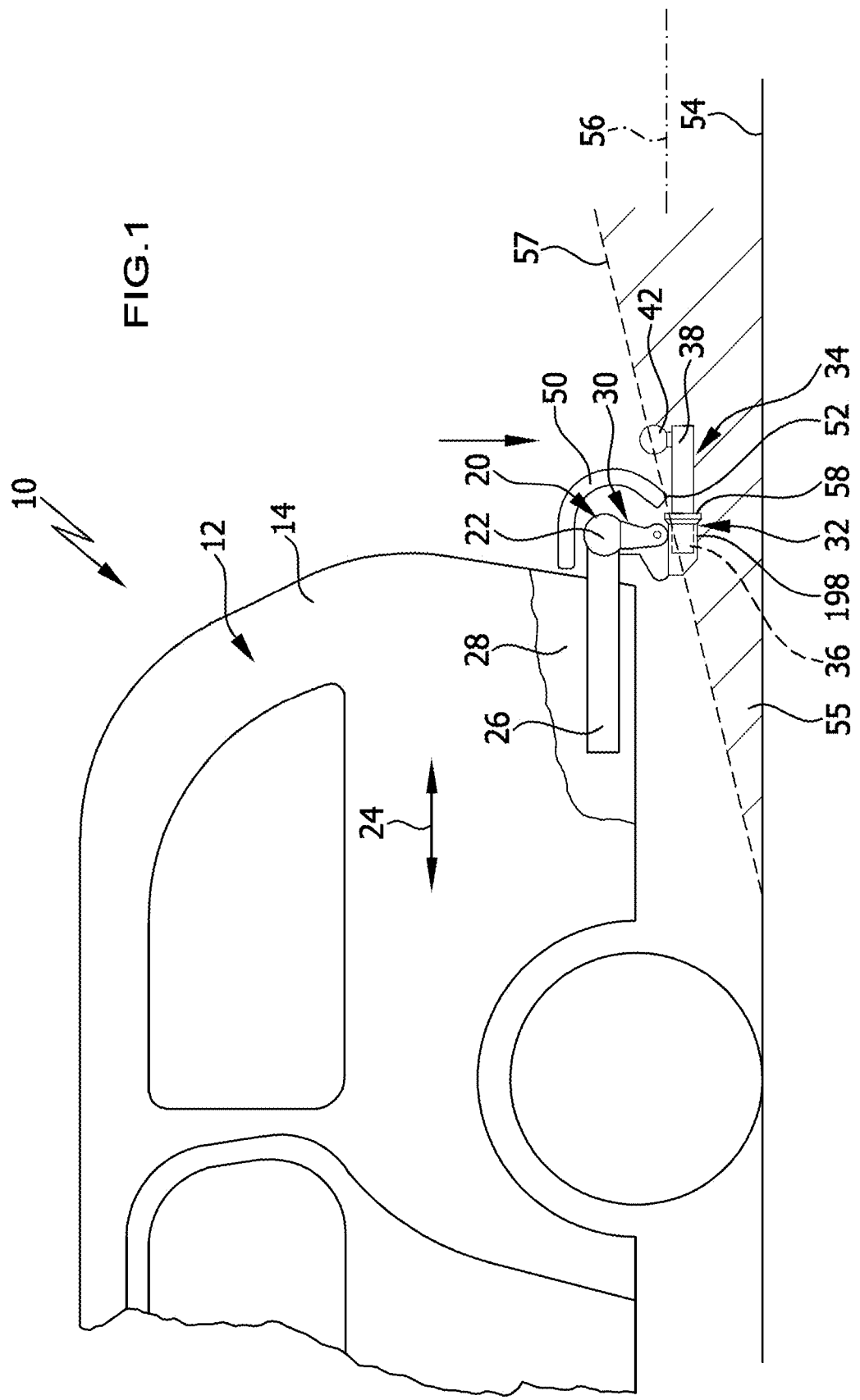
FIG. 1 shows a schematic view of a rear-end region of a motor vehicle with a trailer device mounted thereon.

A motor vehicle shown by way of example in FIG. 1 and denoted as a whole by 20 comprises a vehicle body 12, on which a trailer device 10 according to the invention is mounted in a rear-end region 14.

The trailer device 20, which is shown by way of example in FIGS. 2 to 5 in a working position, comprises a crossmember 22, which extends transversely to a longitudinal direction 24 of the vehicle and is connected to the rear-end region 14 of the vehicle body 12 for example by means of side members 26 extending parallel to the longitudinal direction 24 of the vehicle and arranged on body portions 28 extending likewise in the longitudinal direction 24 of the vehicle.

A holding unit denoted as a whole by 30 is provided on the crossmember 22 and supports a ball neck receiving body denoted as a whole by 32, the ball neck receiving body 32 being arranged pivotably on the holding unit.

Figure 2:
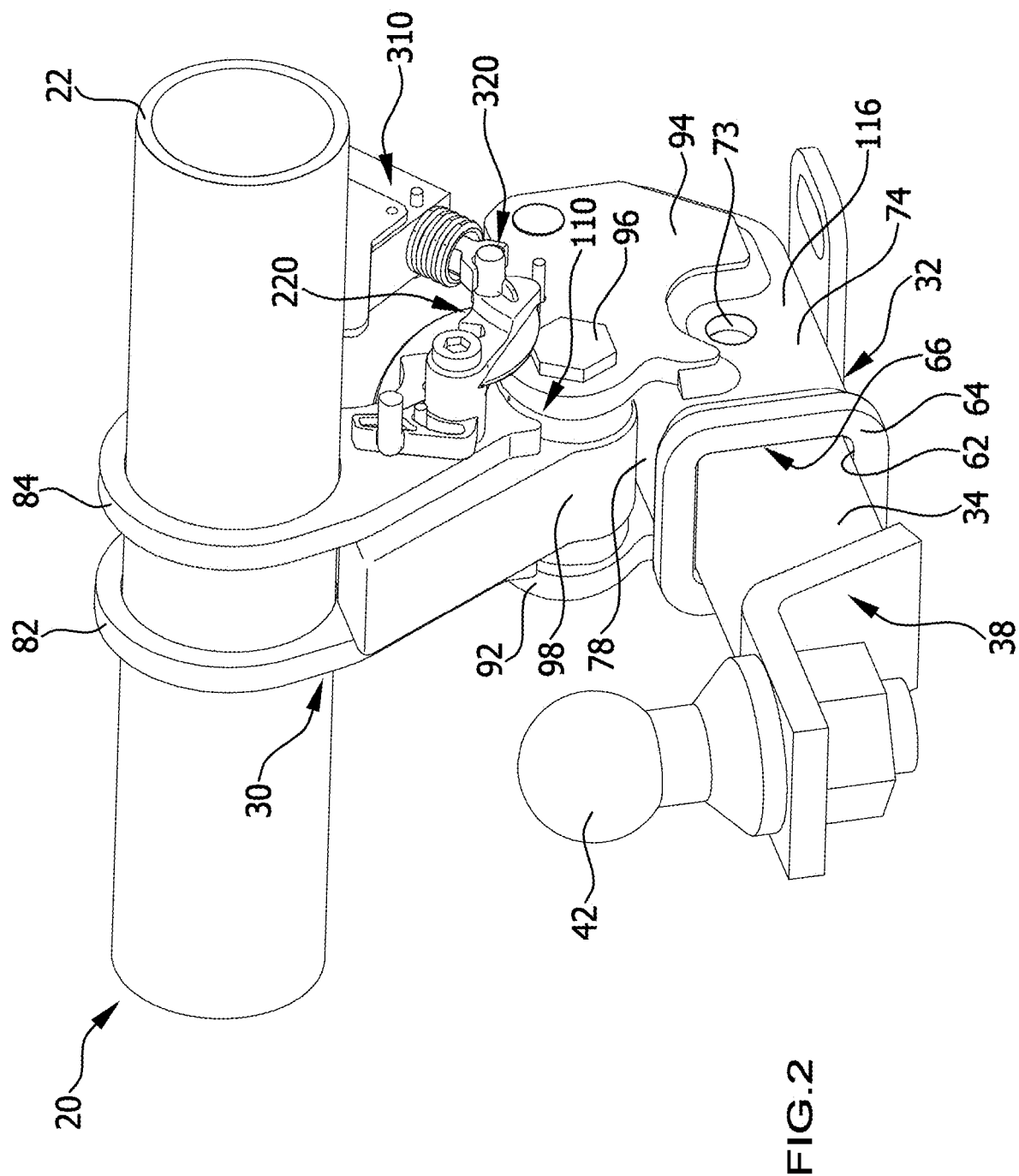
FIG. 2 shows a perspective representation of a first embodiment example of the trailer device in a working position with inserted ball neck.
Figure 3:
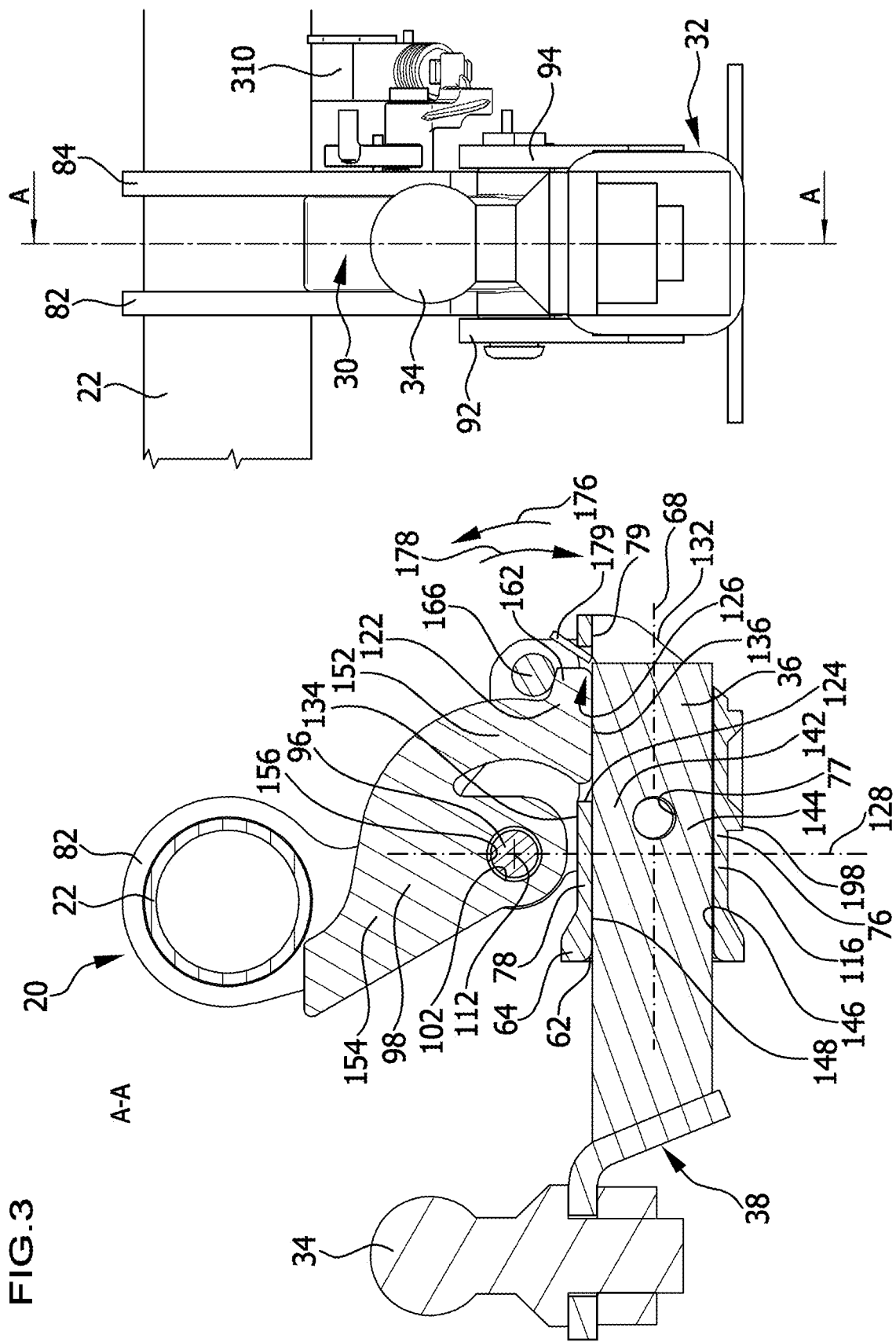
FIG. 3 shows a front view of the trailer device with inserted ball neck and a sectional representation according to the shown section A-A.
Figure 4:
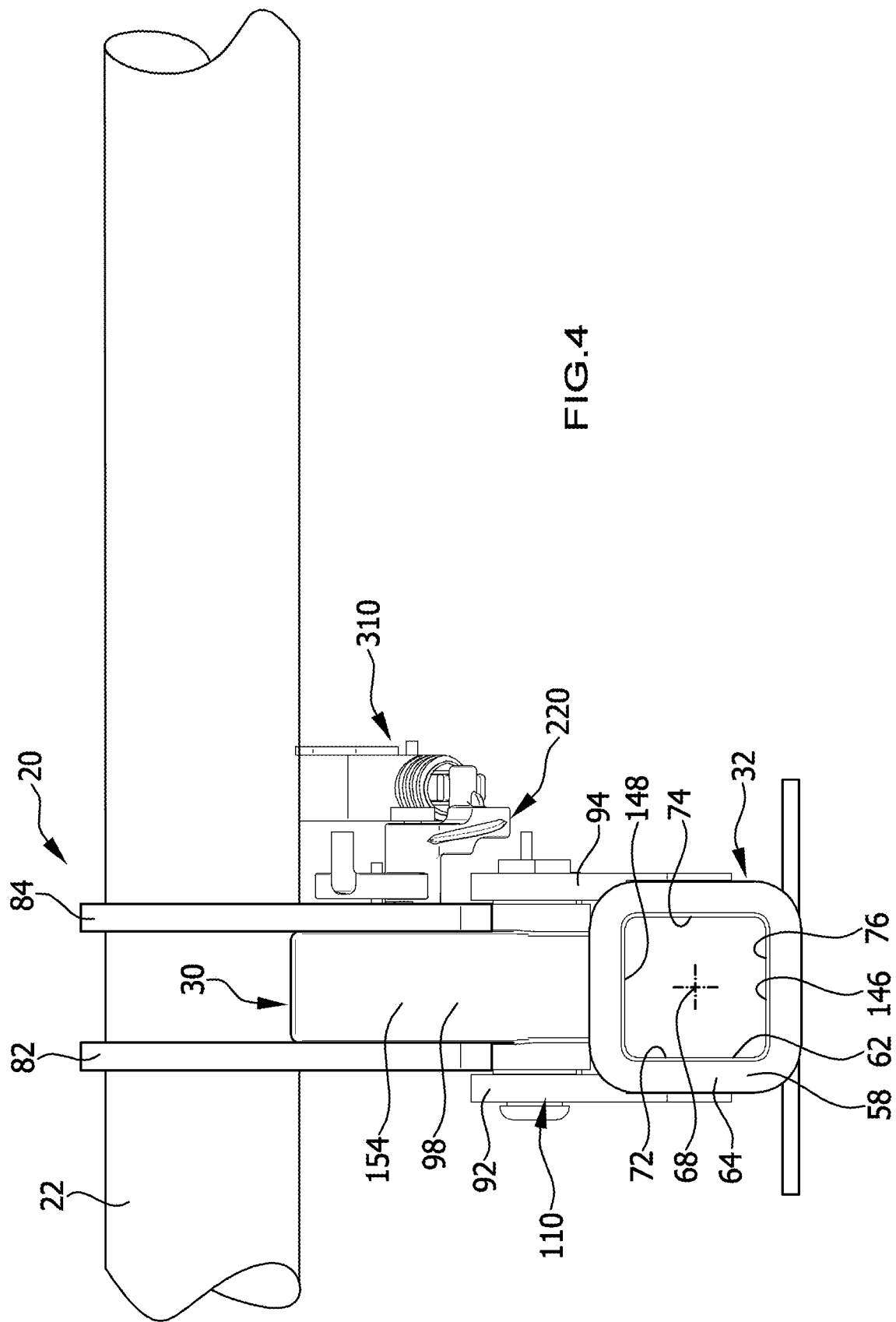
FIG. 4 shows a front view of the trailer device in the working position.
Figure 5:
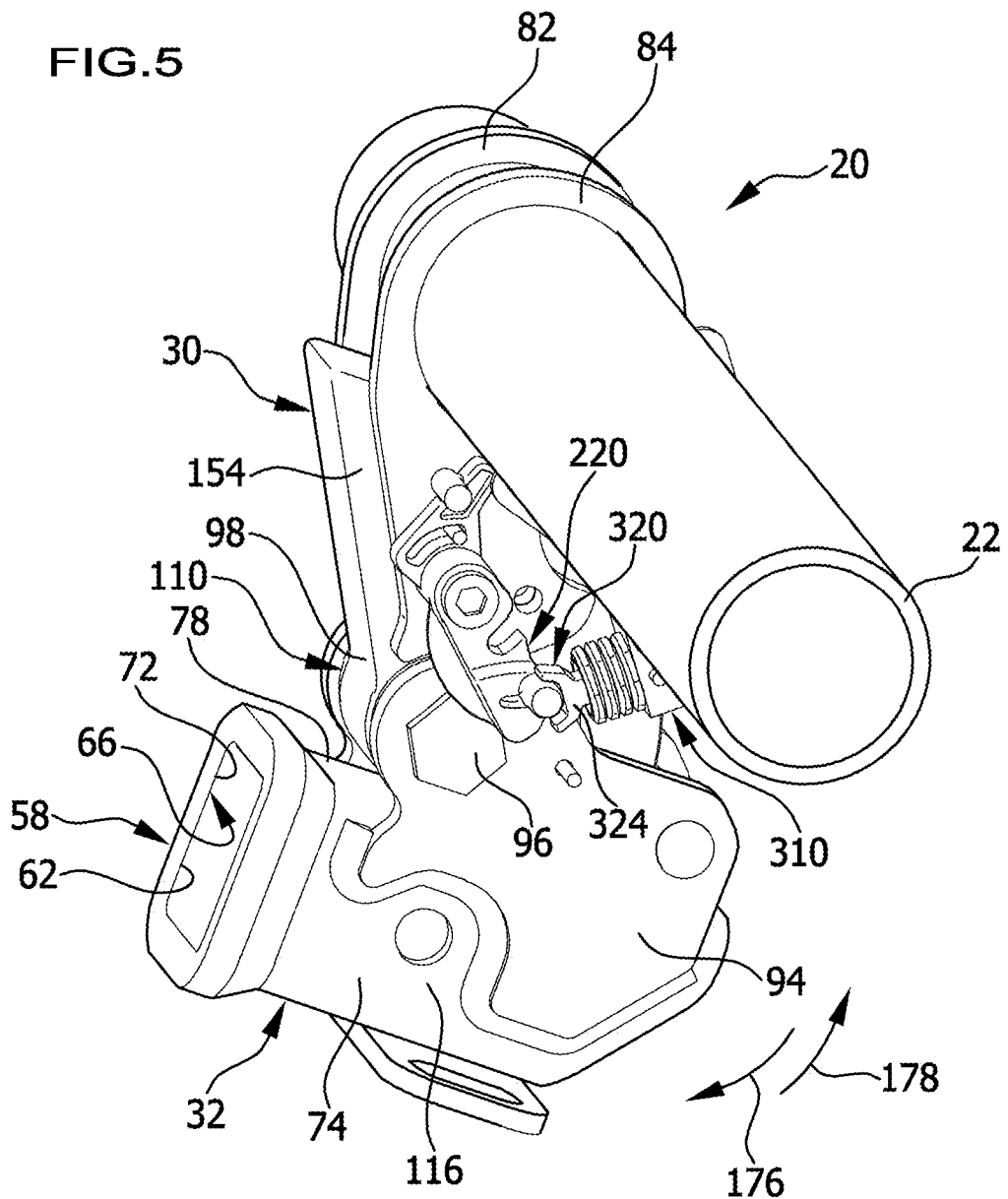
FIG. 5 shows a perspective representation of the trailer device in the working position.

As is shown by way of example in FIGS. 2 and 3, a ball neck denoted as a whole by 34 is insertable by means of an insertion portion 36, which forms an end of the ball neck 34, into said ball neck receiving body 32, whereas another, opposite end 38 of the ball neck 34 protruding beyond the ball neck receiving body 32 supports a coupling ball 42.

In the motor vehicle 10 according to the invention, the crossmember 22, the end portions of the side members 26 for example holding the crossmember 22, and the holding unit 30 are preferably covered by a bumper unit 50 of the body, which passes over the crossmember 22 on an upper side furthest away from the road surface 54 and on a rear side furthest away from the rear-end region 14 of the body 12 and likewise passes over the holding unit 30 on its upper side furthest away from the road surface 54 and on its side furthest away from the rear-end region 14, so that, when viewing the vehicle body 12 from the rear, only the ball neck receiving body 32 below a lower edge 52 of the bumper unit 50 and below a geometric lower-edge plane 56 running parallel to the road surface 54 and through the lower edge 52 lies in a field of view 55 in the working position of the ball neck receiving body, so that, in the working position, an insertion opening 62 at an end face 58 of the ball neck receiving body 32 is visible and is preferably surrounded by a reinforcement collar 64 of the ball neck receiving body 32.

The field of view 55 is delimited here by a viewing line 57 inclined by at least approximately 15° relative to the road surface 54 and touching the lower edge 52 of the bumper unit 50 and lies below said line.

Starting from the insertion opening 62, a ball neck receptacle 66 extends into the ball neck receiving body 32 preferably having a sleeve-like basic shape, the ball neck receptacle 66 preferably having a rectangular, in particular a square cross-sectional shape.

In the working position of the ball neck receptacle 66, a center axis 68 of the ball neck receptacle 66 preferably runs at least approximately parallel to the direction of travel 24 and also at least approximately horizontally when the motor vehicle 10 is positioned on a horizontal road surface 54.

The ball neck receiving body 32 has, in particular, mutually opposing side walls 72 and 74 and also transverse walls 76 and 78 connecting the side walls, wherein in particular the side walls 72 and 74 and the transverse wall 76 and 78 in each case run parallel to the center axis 68.

At a spacing from the insertion opening 62, the ball neck receiving body 32 is provided in the region of the mutually opposing side walls 72 and 74 with through openings 73, through which a fixing pin (not shown in the drawing) can be inserted in order to engage through an opening 77 in the insertion portion 36 of the ball neck 34 inserted into the ball neck receptacle 66 and fix said ball neck relative to the ball neck receiving body 32, so that the ball neck is fixed in the ball neck receptacle 66 so as to be at least substantially immovably in respect of movements in a direction parallel to the center axis 68.

In addition, the insertion portion 36 is likewise fixed in the ball neck receptacle 66 against a rotary movement about the center axis 68, in particular in that the ball neck receptacle 66 has an at least approximately rectangular cross-sectional shape, and in addition is also fixed against movements transverse to the center axis 68 in that the insertion portion 36 of the ball neck 34 is guided only with little play in the ball neck receptacle 66 by the side walls 72 and 74 and the transverse walls 76 and 78.

The ball neck receiving body 32 is preferably constructed such that the ball neck receptacle 66, starting from the insertion opening 62, extends fully through said opening, more specifically for example as far as a rear-side opening 79 of the ball neck receiving body 32 opposite the insertion opening 62.

As can be seen for example from FIG. 1, the ball neck receiving body 32 arranged on the motor vehicle 10 by means of the holding unit 32 and the crossmember 22 lies above the road surface 54 and is positioned at a spacing from the road surface 54 such that said body is positioned for example close to a geometric lower-edge plane 56 running through the lower edge 52 of the bumper unit 50 and extending approximately parallel to the road surface 54, more specifically below said plane, for example at most at a spacing from said plane corresponding to a maximum extent of the ball neck receiving body 32 perpendicularly to the center axis 68.

The ball neck 34 is thus easily insertable into the easily accessible insertion opening 62 of the ball neck receptacle 66, and the ball neck receiving body 32 is also accessible in such a way that the fixing pin can be inserted through the openings 73 and 77 with good accessibility.

The holding unit 30 comprises in particular two side parts 82 and 84, which are connected to the crossmember 22 and extend starting from the crossmember 22 in the direction towards the ball neck receiving body 32, and a pivot bearing unit, denoted as a whole by 110, on which the ball neck receiving body 32 is arranged mounted so as to be pivotable about a pivot axis 112 at least between the working position and a rest position.

To this end, the ball neck receiving body 32, in particular the side walls 72, 74 thereof, is connected for example to bearing elements 92 and 94, which are pivotable relative to a bearing pin 96 of the pivot bearing unit 110. For example, the bearing pin 96 engages through a bearing opening 102 of a pin carrier 98 of the holding unit 30 and through openings 106 and 108 in the bearing elements 92 and 94 respectively.

In particular, the pin earner 98 is arranged between the side parts 82, 84 and fixedly connected thereto. In variants, the side parts 82, 84 form the pin carrier 98 and have the through openings forming the bearing through opening 102.

In this case, the bearing pin 96 is either mounted rotatably in the bearing through opening 102 or passes through the bearing opening 102 and is arranged non-rotatably on the holding unit, and the bearing elements 92 and 94 are mounted rotatably relative to the bearing pin 96 with the through openings 106 and 108.

In variants, the bearing pin 96 is fixedly connected to the bearing element 92, 94 and is mounted in the bearing through opening 102 rotatably relative to the pin carrier 98.

In another expedient variant, for reasons of simplicity, the bearing pin 96 is arranged rotatably relative both to the bearing elements 92 and 94 and to the pin carrier 98.

The pivot axis 112 is defined here by a center axis of the bearing pin 96.

For example, the pivot axis 112 is the only pivot axis about which the ball neck receiving body 32 is pivotable relative to the holding unit 30.

Furthermore, in particular the pivot axis 112 runs at least approximately parallel to a longitudinal extent of the crossmember 22.

In the working position, as shown in FIGS. 2 to 5, the ball neck receiving body 32 is arranged at least with its central region 118 comprising the through openings 73 beneath the side parts 82, 84 of the holding unit 30, as viewed in the direction of the force of gravity, and beneath the geometric lower-edge plane 56.

In particular, the ball neck receiving body 32 is arranged pivotably on the holding unit 30 arranged on the motor vehicle 10, in such a way that, with free pivotability of the ball neck receiving body, it is moved at least approximately into the working position as a result of the effect of the force of gravity, that is to say in particular the center of gravity of the ball neck receiving body 32, in the working position, lies beneath the pivot axis 112, based on the direction of the force of gravity.

In order to fix the ball neck receiving body 32 in the working position, as is shown in particular in FIG. 3, a stop element 122 is provided, which passes through an opening 124 of the ball neck receiving body 32. The through opening 124 is provided on a side 134 of the ball neck receiving body 32 facing the pivot axis 112 and lives in a stop region 126, which extends between the central region 118 and a near-side end 132 of the ball neck receiving body 32 remote from the insertion opening 62. In particular, the stop region 126 of the ball neck receiving body 32, in the working position, lies between a vertical 128 through the pivot axis 112 and the rear-side end 132 of the ball neck receiving body 32 remote from the insertion opening 62.

In particular, the through opening 124 lies on a side of the ball neck receiving body 32 closest to the pivot bearing unit 110, preferably in the transverse wall 78 extending at least in part approximately parallel to the pivot axis 112.

The stop element 122 forms a support surface 136 for the insertion portion 35, which support surface faces the ball neck receptacle 66.

Since the stop element 122 in the working position engages through the opening 124, in the working position the support surface 136 forms, as shown by way of example in FIG. 3, a region of an upper inner transverse wall surface 148, which runs in particular parallel to the center axis 68 of the ball neck receptacle 66 and at least in part parallel to the pivot axis 112, delimits the ball neck receptacle 66, and is also formed in part by the transverse wall 78.

A received insertion portion 36 is supported on its side 142 facing the pivot axis 112 against the upper inner transverse wall surface 148 and by means of a side 144 which is opposite the side 142, faces away from the pivot axis 112 and for example faces the road surface 54 against a lower inner transverse wall surface 146 of the transverse wall 76 delimiting the ball neck receptacle 66, wherein in particular the lower inner transverse wall surface 148 likewise runs parallel to the center axis 68 and at least in part parallel to the pivot axis 112.

In order to fix the stop element 122 relative to the holding unit 30, the stop element 122 is held by a stop support 152, which extends from the stop element 122 to a support carrier 154, which for example is arranged between the side parts 82 and 84, and the support carrier 154 is fixedly connected to the crossmember 22.

In particular, the support carrier 154 has a through opening 156, which forms the bearing through opening 102 and is passed through by the bearing pin 96. For example, the support carrier 154 is a forged part connected laterally fixedly to the side parts 82, 84.

The stop support 152 with the stop element 122 arranged at its end preferably extends on a side furthest away from the bumper unit 50 and thus on the side of the holding unit 30 closest to the rear-end region 14 and arranged in the direction of forward travel.

In addition, the stop support 152 also has an end stop 162, which in the working position cooperates with a pivot stop 166 connected to the ball neck receiving body 32 to limit a pivot movement of the ball neck receiving body 32 about the pivot axis 112 and to Fix said body in the working position, as is shown by way of example in FIG. 2.

In this case, in the region of the stop region 126, the pivot stop 166 is spaced slightly from the side 134 of the ball neck receiving body 32 substantially facing the pivot axis 112, between the bearing elements 92, 94, and is arranged fixedly connected to said bearing elements, and the end stop 162, which in particular is constructed as part of the stop element 122, lies in the working position between the pivot stop 166 and the ball neck receiving body 32, in particular in the region of the through opening 156.

The end stop 162, together with the pivot stop 166, therefore prevents the ball neck receiving body 32, coming from the rest position, from being pivoted in a pivot direction 178 beyond the working position, since in the working position the end stop 162 and the pivot stop 166 bear against one another and block a pivoting in the pivot direction 178.

In addition, in the event that an insertion portion 36 is inserted sufficiently far into the ball neck receptacle 66, pivoting of the ball neck receiving body 32 in the working position in a pivot direction 176 opposite the pivot direction 178 and oriented from the working position into the rest position is prevented in that the insertion portion 36 bears against the support surface 136 of the stop element 122 and thus prevents the unit formed of the ball neck receiving body 32 and insertion portion 36 from being pivotable in the pivot direction 176, since these prevent the end 132 of the ball neck receiving body 32 opposite the insertion opening 62 from moving together with the insertion portion 36 in the direction towards the support carrier 154.

The unit formed of the ball neck receiving body 32 and ball neck 34, when the insertion portion 36 is inserted sufficiently far, in the working position is thus fixed non-rotatably based on the pivot axis 112, since on the one hand the end stop 162 and the pivot stop 166 and on the other hand the insertion portion 36 fixed in the ball neck receptacle 66 together with the stop element 122 prevent said unit from pivoting in the pivot directions 178 and 176.

In the case that the insertion portion 36 is fixed by the inserted fixing pin, the ball 34 is therefore fixed in the ball neck receptacle 66 both in relation to the pivot directions 176 and 178 and non-rotatably about the center axis 68 and linearly parallel and transverse thereto in such a stable manner that this fixing is able to withstand the operating loads during trailer operation.

In expedient variants of the embodiment, a sensor 179 shown by way of example and schematically in FIG. 3 is provided in the stop region 126 and can be used to detect whether the insertion portion 36 is inserted in the ball neck receptacle 66 over a minimal extent sufficient to fix the unit formed of the ball neck receiving body 32 and ball neck 34 non-rotatably about the pivot axis 112, i.e. in particular whether the insertion portion 36 bears at least in part against the support surface 136. In particular, in the case that the insertion portion 36 is inserted over the minimal extent, the through openings 73 of the ball neck receiving body 32 and the through opening 77 of the ball neck 34 are oriented in alignment with one another at least to such an extent that the fixing pin is insertable into said through openings and thus the insertion portion 36 can be fixed in the ball neck receptacle 66 in the insertion direction, and therefore the sensor 179 also detects whether the insertion portion 36 is inserted far enough for fixing in the insertion direction.

Figure 6:
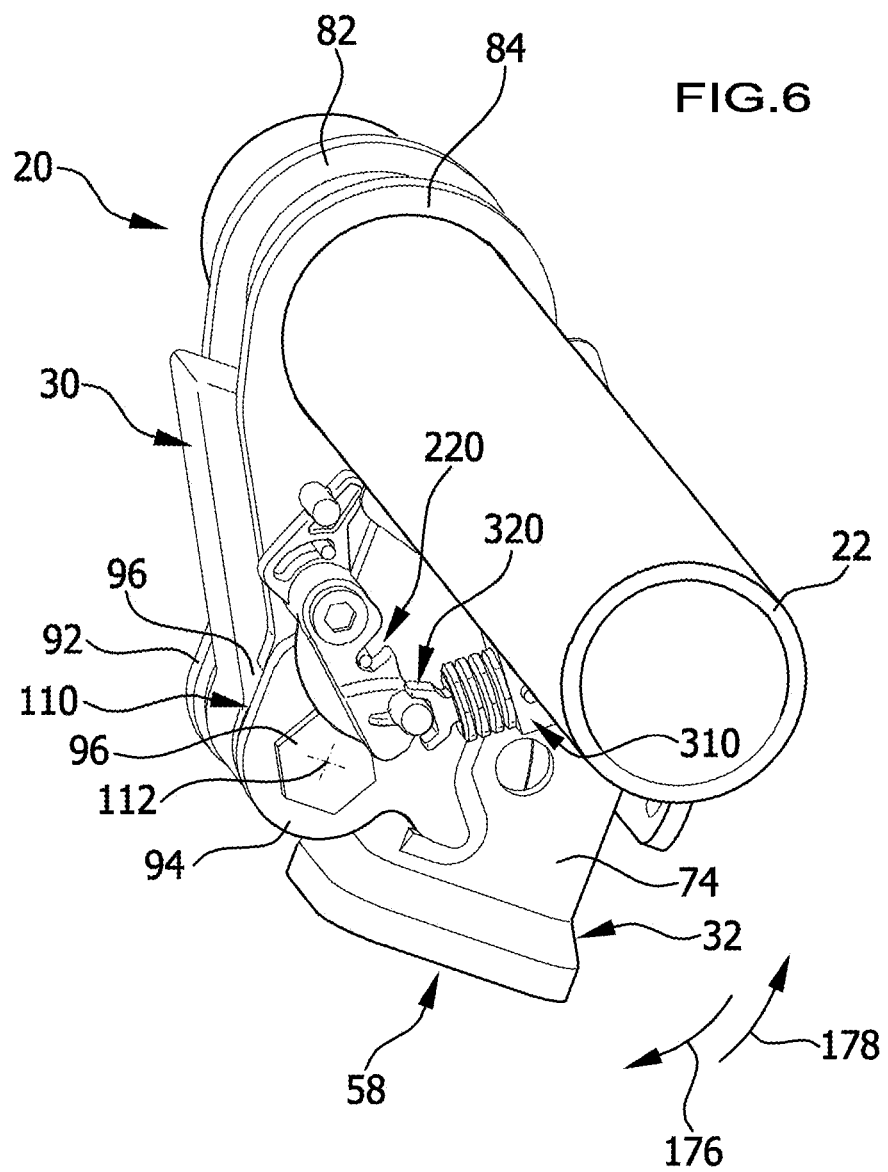
FIG. 6 shows a perspective representation of the trailer device in the rest position.
Figure 7:
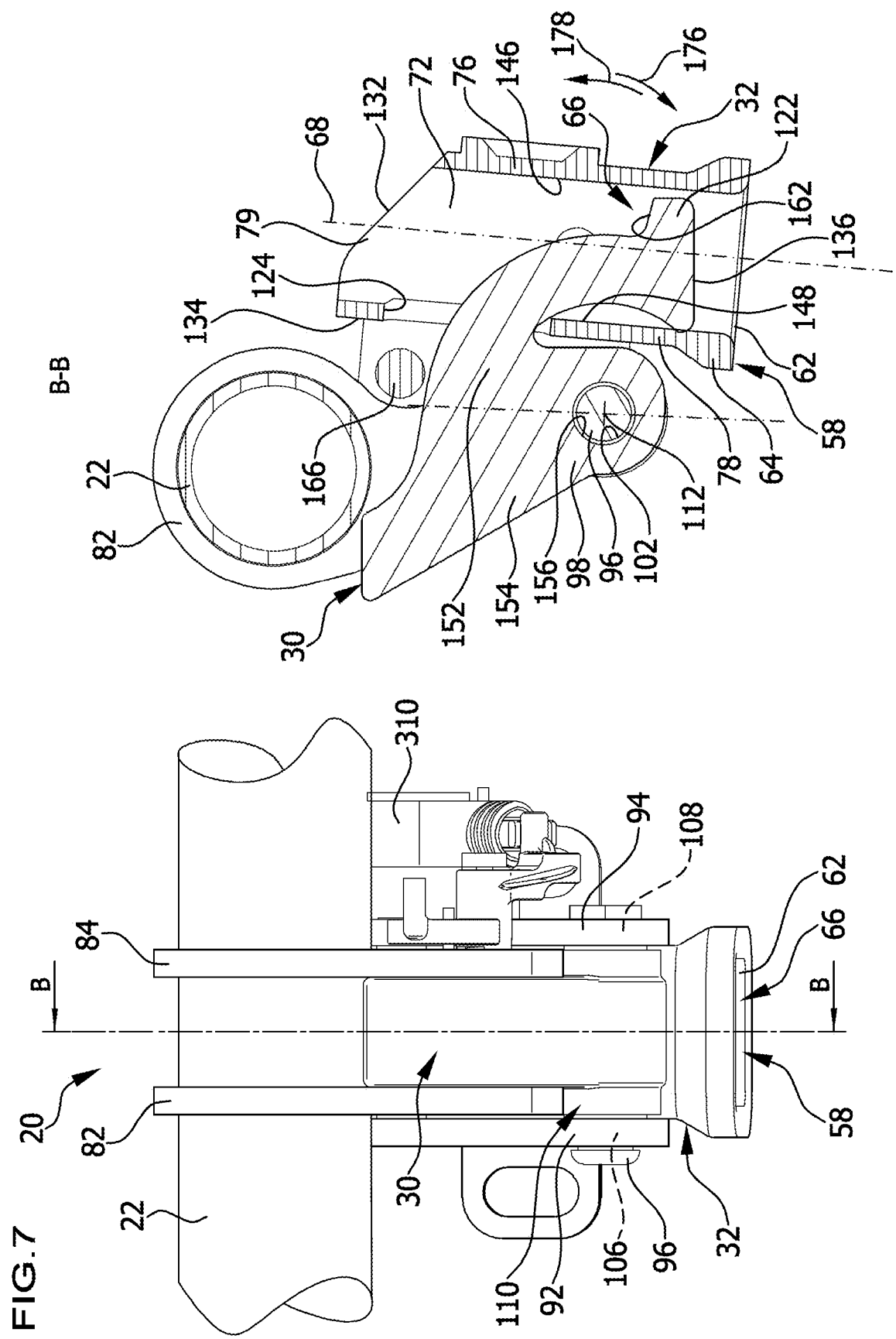
FIG. 7 shows a plan view of the trailer device in the rest position and a sectional representation according to the shown section B-B.

If, however, the insertion portion 36 of the ball neck 34 is removed from the ball neck receptacle 66, in the working position the above-described blocking of the pivot movement of the ball neck receiving body 32 in the pivot direction 176 oriented towards the rest position is lifted, and it is possible, as shown by way of example in FIGS. 6 and 7, to pivot the ball neck receiving body 32 from the working position into the rest position, wherein the end 132 of the ball neck receiving body 32 opposite the insertion opening 62 moves in the direction towards the support carrier 154.

During this pivot movement of the ball neck receiving body 32 in the pivot direction 176, the stop element 122 projects together with the stop support 152 through the opening 124 in the ball neck receptacle 66 of the ball neck receiving body 32, such that, as shown in FIG. 7, in the rest position the stop element 122 with the stop support 152 lies within the ball neck receptacle 66, without blocking the pivoting of the ball neck receiving body 32 in the pivot direction 176 into the rest position.

To this end, the stop support 152 is preferably constructed so that it extends arcuately away from the support carrier 154 as far as the stop element 122 and the stop element 122 has an extent, at least approximately perpendicularly to the center axis 68 of the ball neck receptacle 66, that is preferably smaller than, but for example at least half the size of the extent of the ball neck receptacle 66 at least approximately perpendicularly to its center axis 68 and transversely to the pivot axis 112.

In addition, a side of the stop support 152, in particular facing away from the pivot axis 112, is at least approximately arc-shaped, in such a way that the pivot stop 166 in the event of the pivot movements in the pivot directions 176 and 178 is entrained unhindered with the ball neck receiving body 32 along this side of the stop support as far as a basic position in the rest position or as far as the end stop 162 in the working position.

It is thus possible for the ball neck receiving body 32, without the insertion portion 36 of the ball neck 34 inserted into the ball neck receptacle 66, to pivot between the working position, shown by way of example in FIGS. 2 to 5, and the rest position shown by way of example in FIGS. 6 and 7, wherein, as the ball neck receiving body 32 is pivoted from the rest position into the working position in the pivot direction 178, the pivot movement is delimited by the cooperation of the end stop 162 with the pivot stop 166.

As can be seen for example from FIGS. 2 to 5 and 6 and 7, the ball neck receiving body 32 is lifted by the pivoting in the pivot direction 176 about the pivot axis 112 with the end 132 opposite the insertion opening 62 and pivoted in the direction towards the crossmember 22, and at the same time the end face 58 with the insertion opening 62 initially moves downwards away from the lower edge 52 of the bumper unit 50 and thus also from the plane 56, but is then raised by being pivoted further, so that, ultimately, in the rest position shown by way of example in FIGS. 13 to 17, the insertion opening 62 is raised to such an extent that the end face 58 of the ball neck receiving body 32 having the insertion opening 62 faces the road surface 54 and is the lowest region of the ball neck receiving body 32 and, in addition, is arranged at a greater spacing from the road surface 54 than the lowest region 198, facing the road surface, of the ball neck receiving body 32 in the working position, wherein this lowest region 198 based on the working position is preferably formed by a side of the ball neck receiving body 32 facing the road surface 54 in the working position.

In the rest position, the end face 58 preferably lies in a plane 204 running at least approximately parallel to the road surface 54 and having a greater spacing from the roadway 54 than the center axis 68 of the ball neck receptacle 66 in the working position of the ball neck receiving body 32.

For example, the ball neck receiving body 32, in the rest position, as shown in FIGS. 6 and 7, lies in front of the pivot axis 112, as viewed in the direction of forward travel of the motor vehicle 10, and thus on a side of the pivot axis 112 closest to the rear-end region 14 of the body 12.

In particular, it is provided here that the center axis 68 of the ball neck receptacle 66, in the rest position, runs at least approximately parallel to the vertical 128 when a motor vehicle 10 provided with the trailer device 20 is arranged on a horizontal road surface.

These positions of the ball neck receiving body 32 both in the working position and in the rest position are achievable in particular in that the support carrier 154 with the stop support 152 and in particular the stop element 122 and the end stop 162 are dimensioned in such a way that these parts are arranged outside the path of the ball neck receiving body 32 and in particular of the bearing elements 92, 94 and the pivot stop 166 during pivoting between working position and rest position and in particular the stop support 152 and in particular also the stop element 122 can project into the ball neck receptacle 66 during the pivot movement into the rest position.

In addition, the pivoting of the ball neck receiving body 32 about the pivot axis 112 between rest position and working position is achievable in particular in that the pivot axis 112 in the working position of the ball neck receiving body 32 lies on a side of the ball neck receiving body 32 furthest away from the road surface 54 and in addition, as considered in the vertical 128, above a region of the ball neck receiving body 32 which extends from the end face 58, has the through openings 72 for the fixing pin, and extends parallel to the center axis 68, at most as far as a longitudinal center of the ball neck receiving body 32.

In order to fix the ball neck receiving body 32 in the rest position, a locking device denoted as a whole by 220 and which is shown by way of example in FIGS. 8 to 16 is provided, wherein, in a locking state, the locking device 220 fixes the ball neck receiving body 32 relative to the holding unit 30 and thus secures it.

Figure 12:
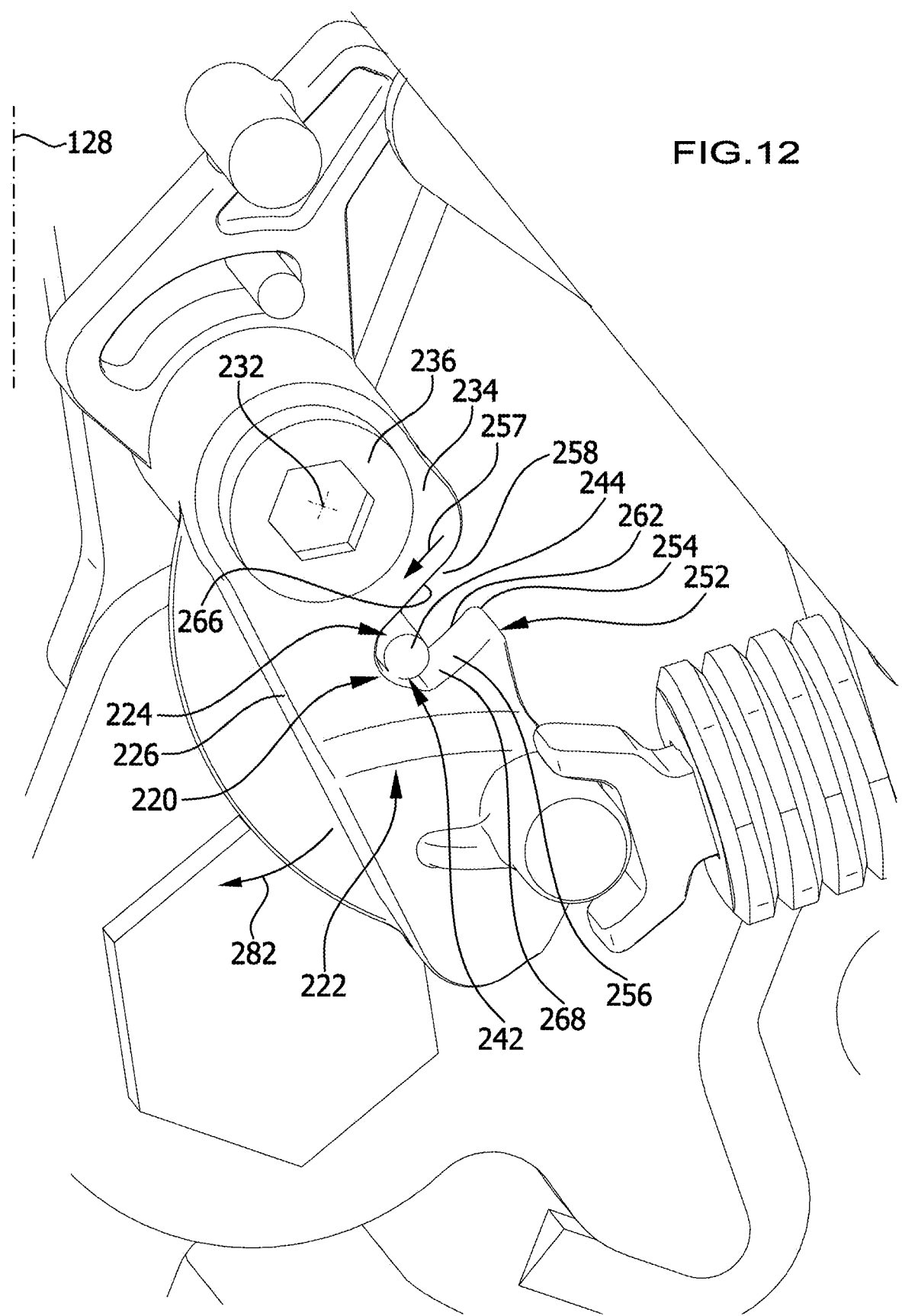
FIG. 12 shows an enlarged representation in the region of the locking device in its locking state.

To this end, as shown by way of example in FIG. 12, the locking device 220 has a locking component 222 associated with the holding unit 30, which locking component, in this embodiment example, comprises a locking bar body receiving element 226 which has a locking bar body receptacle 224 and for example is constructed as a plate-like lever locking bar. The locking bar body receiving element 226 is rotatable about a rotation axis 232 between a plurality of locking positions associated with the locking state and a plurality of unlocking positions associated with an unlocking state, for which purpose the locking bar body receiving element 226 is mounted on the holding unit 30, in particular on the side part 84, rotatably in a rotation portion 234 for example by means of a rotary pin 236, as is shown by way of example in FIGS. 13 and 14, and is preferably arranged on a side of the side part 84 facing away from the pin carrier 98 arranged between the side parts 82, 84. In particular, the locking bar body receiving element 226 is arranged mounted rotatably laterally along the side part 84.

The rotation axis 232 runs preferably at least approximately perpendicularly to the vertical 128, provided the vehicle is on a horizontal road surface, and at least approximately parallel to the pivot axis 112. Based on the vertical 128, the rotation axis 232 runs above the pivot axis 112, so that the locking bar body receiving element 226 and the ball neck receiving body 32 are mounted preferably in geometric planes at least approximately parallel to one another, but rotatably or pivotably about different axes 232, 112.

Figure 8:
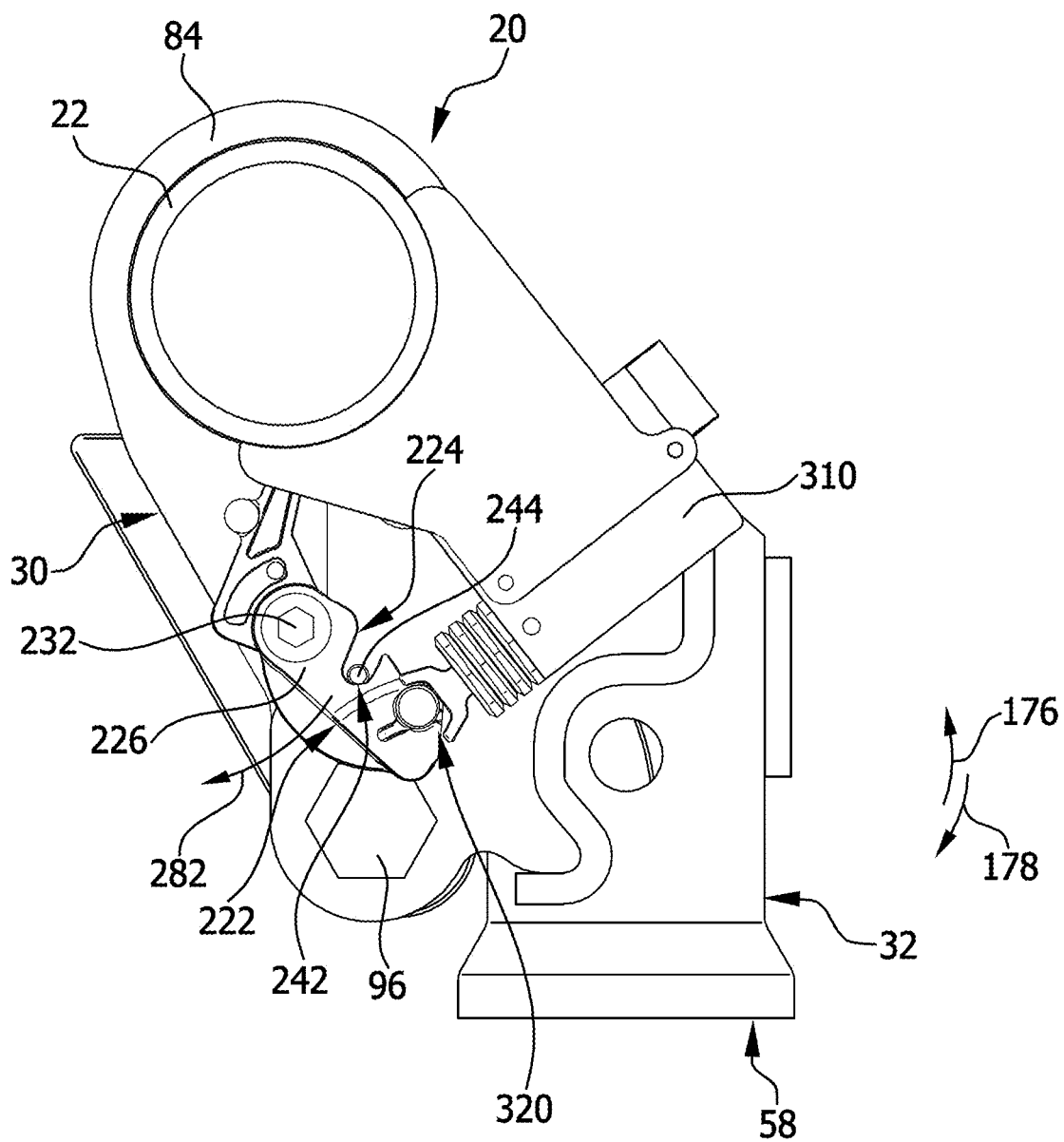
FIG. 8 shows a side representation of the trailer device in the rest position with a locking device in a locking state.
Figure 9:
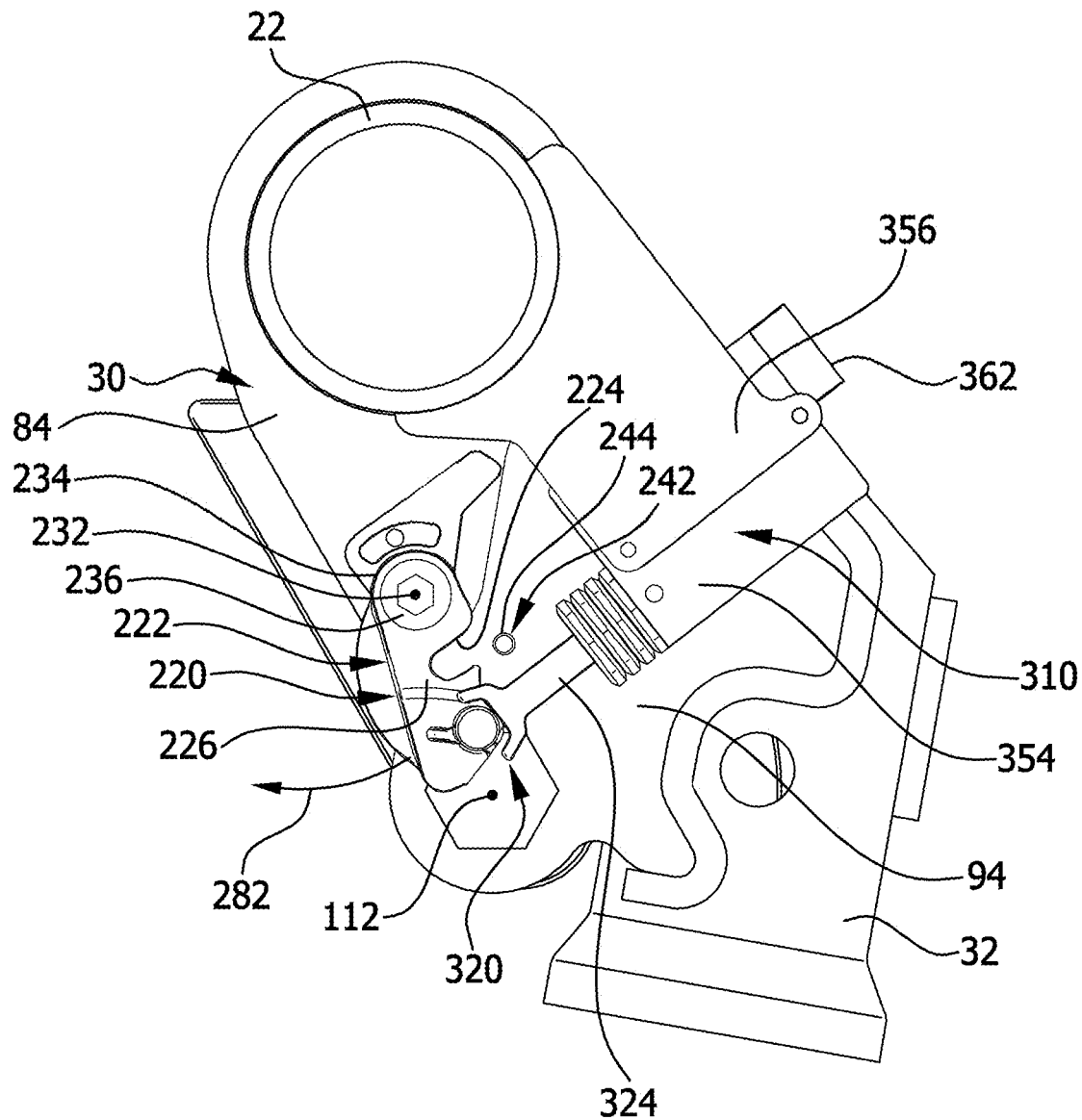
FIG. 9 shows a side representation of the trailer device with a locking device moved into an unlocking state.
Figure 10:
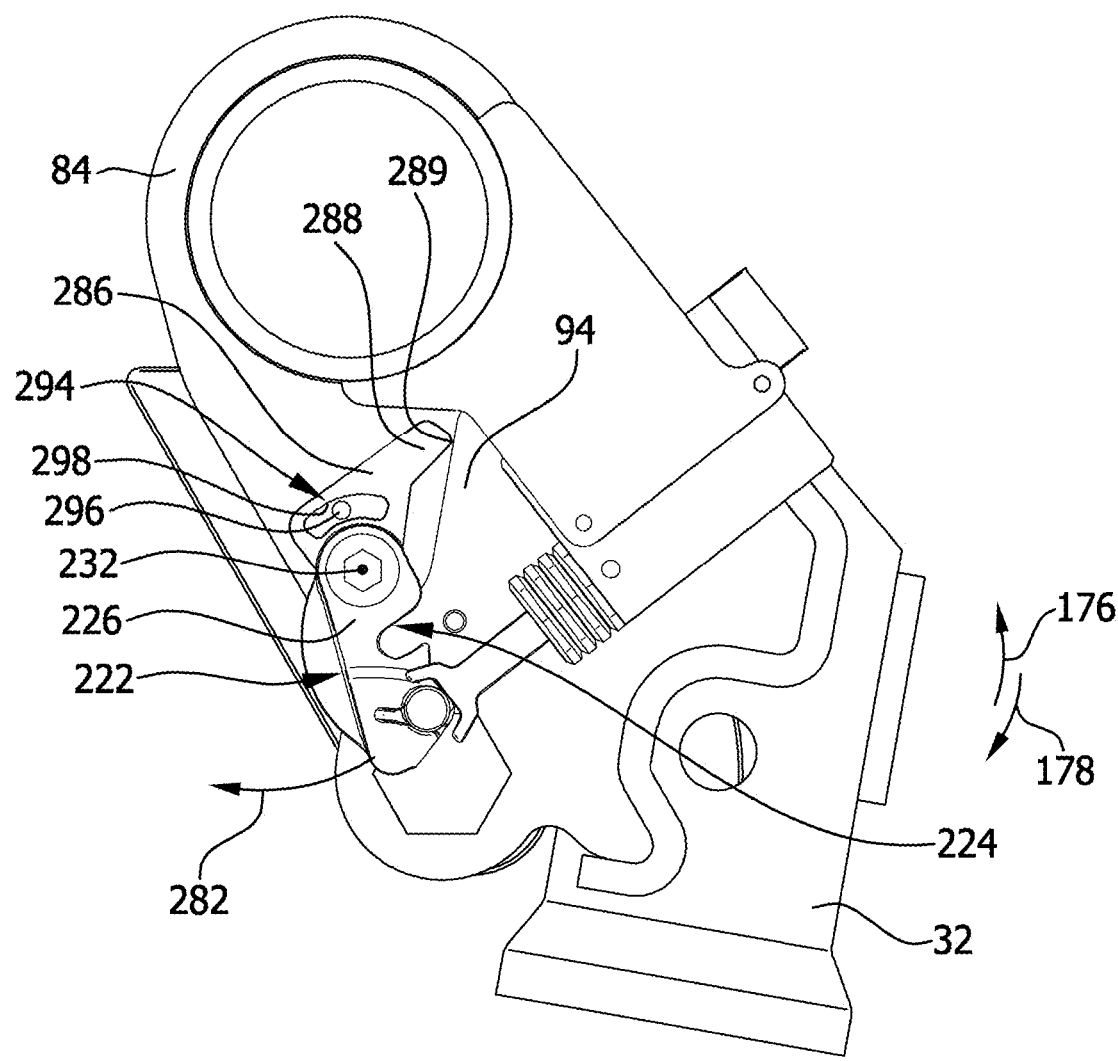
FIG. 10 shows a side representation of the locking device moved in an unlocking state with an initial element and a rotary limiter.
Figure 11:
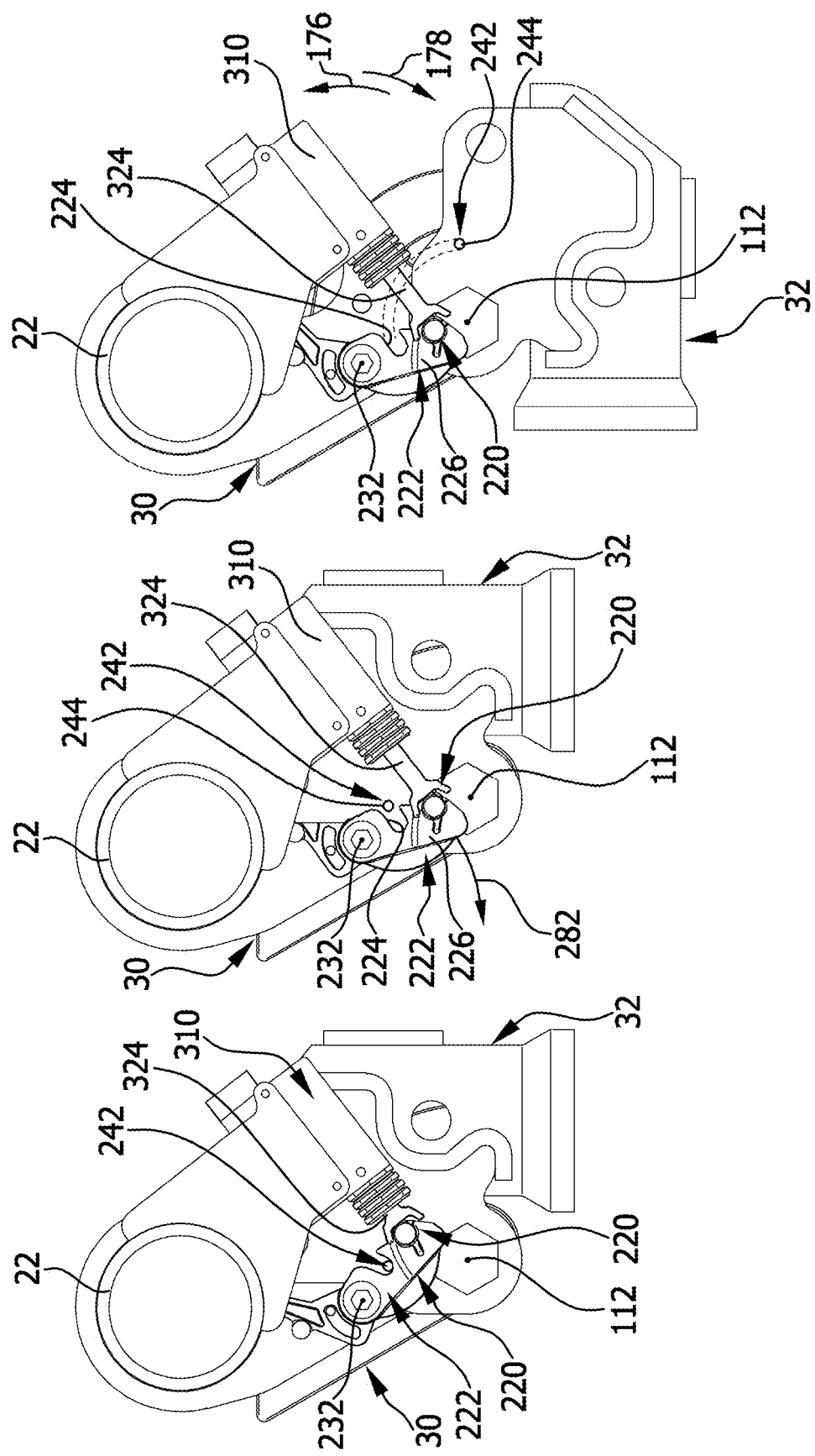
FIG. 11 shows three side representations of the trailer device with the locking device in a locking state, an unlocking state, the ball neck receiving body in the rest position in each case, and with the ball neck receiving body moved into the working position.

Furthermore, the locking device 220 has a locking component 242, which is associated with the ball neck receiving body 32 and comprises a locking bar body 244, as is shown by way of example in FIG. 12, which in the locking state is received in the locking bar body receptacle 224, as is shown by way of example also in FIGS. 8 and 11, and in the unlocking state is movable uninfluenced by the locking component 222 associated with the holding unit 30, in particular the locking bar body receptacle 224 of said locking component, as is shown by way of example also in FIGS. 9 to 11.

The locking bar body 244 is fixedly connected to the ball neck receiving body 32, in particular by means of a connection element, more specifically in particular in such a way that the locking bar body 244 assumes locking positions comprised by the locking state when the ball neck receiving body 32 assumes the rest position.

Figure 13:
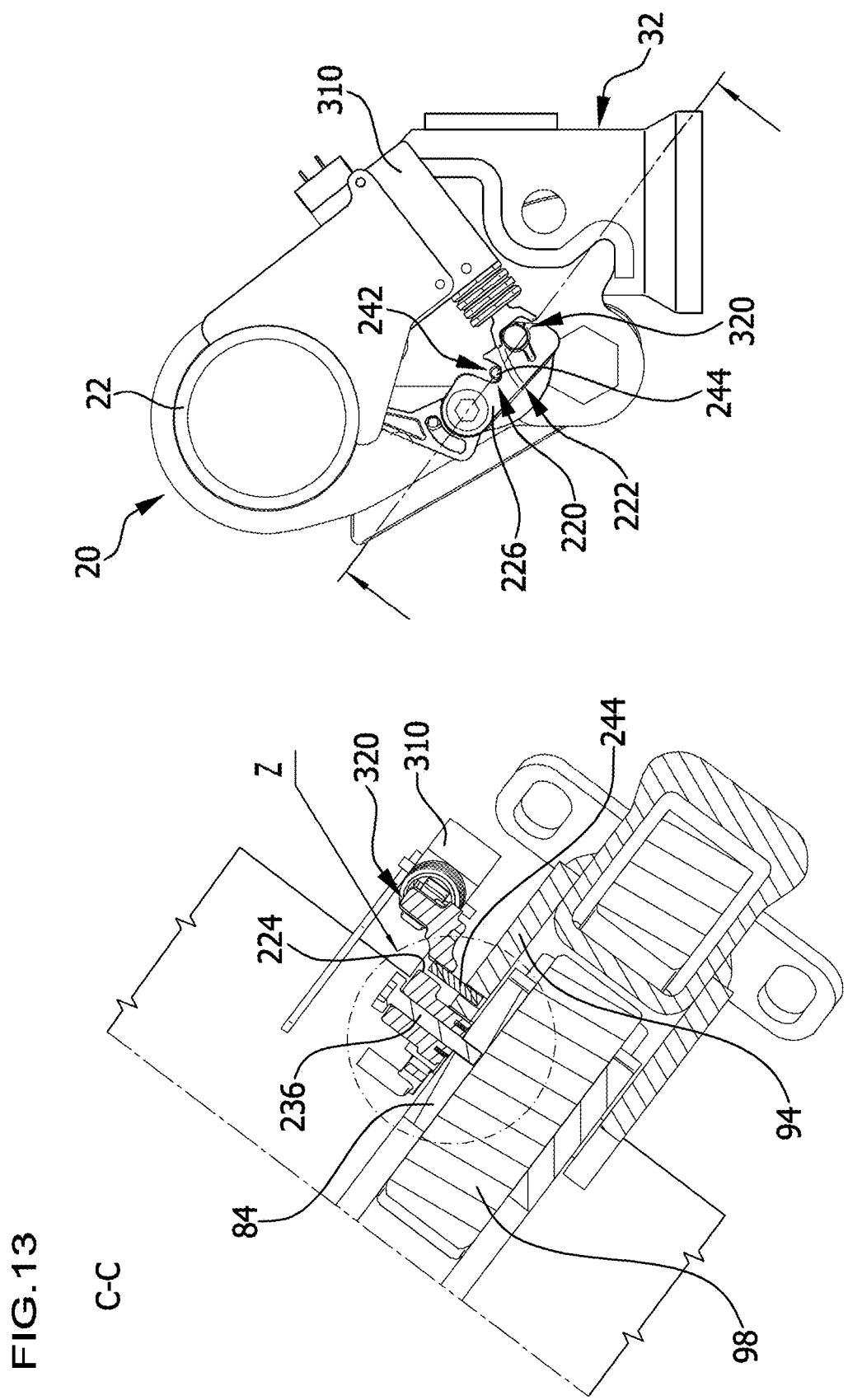
FIG. 13 shows a representation of the locking device and a sectional representation according to the shown section C-C.
Figure 14:
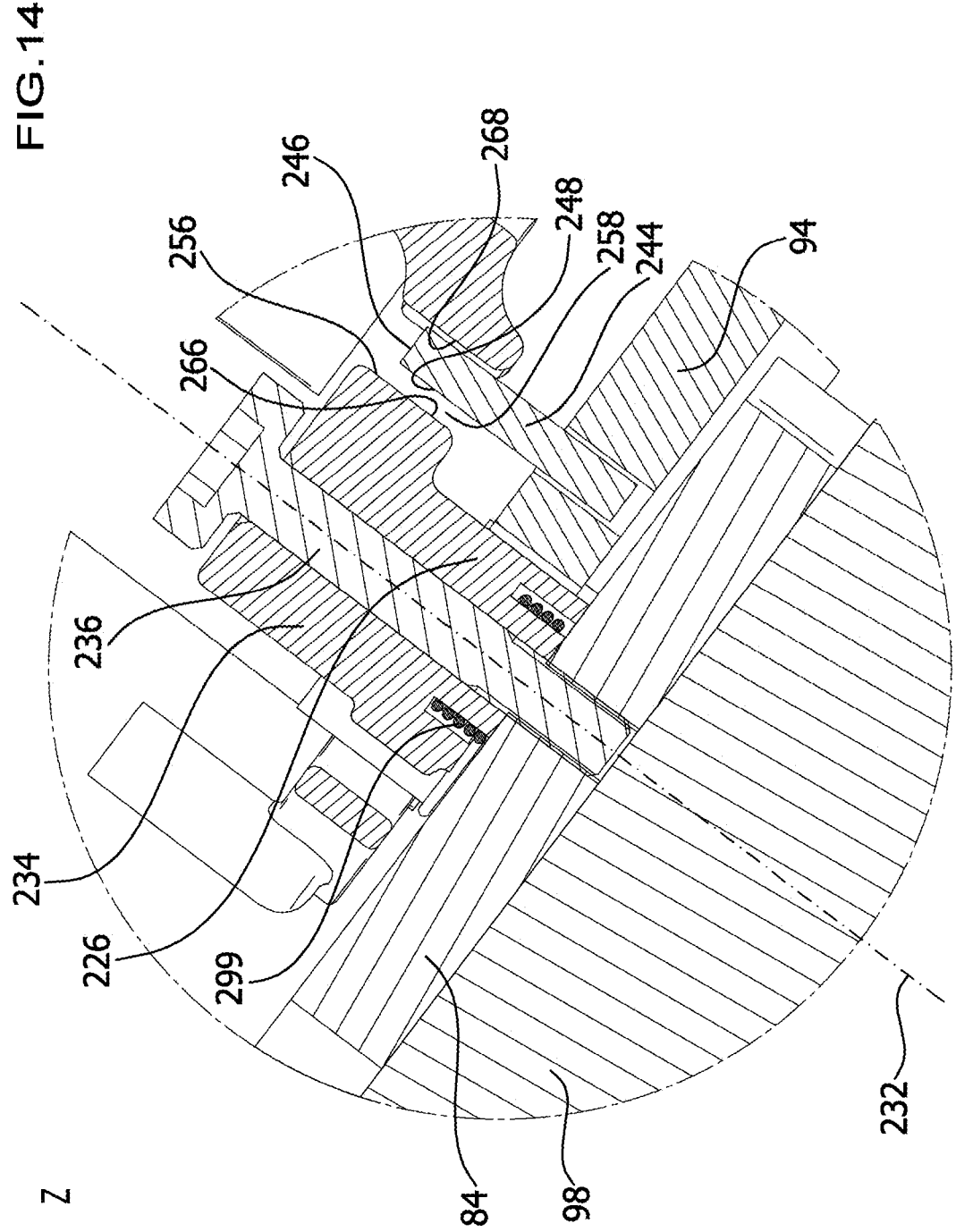
FIG. 14 shows an enlarged representation of a detail of the sectional drawing according to FIG. 13 in the region Z of a rotary pin and a locking bar body engaging in a locking bar body receptacle.

The locking bar body 244 constructed for example as a pin, extends from a positioning portion arranged on the connection element, here the bearing element 94, to a protruding locking bar body end face 246 and in between has lateral locking bar body guide surfaces 248, which in particular run from the locking bar body end face 246 at least approximately as far as the positioning portion, as is shown by way of example in FIGS. 13 and 14.

In particular, the locking bar body 244 is arranged on the bearing element 94 and is constructed in a manner extending away from an outer side, wherein the locking bar body extends at least in part in a locking state into the locking bar body receptacle 224 and for example through said receptacle.

For the engagement of the locking bar body 244 with the locking bar body receptacle 224, the locking bar body receptacle 224, as is shown by way of example in FIG. 12, has a receiving opening 254 on an opening side 252, starting from which opening a receiving space 258 delimited by receiving walls 256 extends in a receiving direction extent 257 into the locking bar body receiving element 226, wherein the receiving space 258 is open outwardly along a guide portion 262 starting from the receiving opening 254, so that the locking bar body 244 in the locking state can engage in the guide portion 262 of the receiving space 258 and is guided transversely to the receiving direction extent 257 by the receiving walls 256, as is also shown by way of example in FIG. 14.

In this case, receiving wall portions 264, 266 of the receiving walls 256 run along the guide portion 262 at least approximately parallel to one another, starting from the receiving opening 254 in the direction towards the receiving direction extent 257 and are spaced from one another transversely thereto by a spacing corresponding at least approximately to a thickness of the locking bar body 244 and run as far as an end region of the locking bar body receptacle 224, in which a receiving end wall portion 268 connects the receiving guide wall portions 264, 266 to one another at their ends. For example, the locking bar body receptacle 224, in particular when the locking bar body receiving element 226 is constructed in a plate-like manner, is constructed as a through opening extending transversely to the receiving direction extent 257 from one side to the opposite side continuously along the receiving guide wall portions 264, 266 and from the receiving opening 254 in the direction towards the receiving direction extent 257 to the receiving end wall portion 268.

The locking bar body 244, in order to move the locking device 220 into the locking state, can thus be introduced through the receiving opening 254 in the locking bar body receptacle 224 interlocking positions and can be guided along the receiving guide wall portions 264, 266 along the guide portion 262 by the locking bar body receptacle 224 by its locking bar body guide surfaces 248 as far as the receiving end wall portion 268 defining a locking end position.

In the locking positions of the locking bar body receiving element 226 comprised by the locking state, the receiving direction extent 257 runs obliquely to the vertical 128, provided the motor vehicle is on a horizontal road surface, wherein the receiving end wall portion 268, based on the vertical 128, runs beneath the receiving opening 254 and the receiving guide wall portions 264 run obliquely to the vertical 128 upwardly to the receiving opening 254.

The received locking bar body 244, which is pressed downwardly together with the ball neck receiving body 32 connected to it as a result of the force of the weight of said ball neck receiving body, is thus supported by the receiving walls 256, in particular by the lower receiving guide wall portion 266 and the receiving end wall portion 268, at least substantially in the vertical direction and for example is fixed in the locking position, so that the ball neck receiving body 32 connected to it is also unable to pivot out from the rest position substantially in the direction of the force of gravity and is therefore held in this rest position and is fixed relative to the holding unit 30.

In order to now move the locking device 220 into an unlocking state, the locking bar body receiving element 226 is rotatable in an unlocking direction 282 about the rotation axis 232, the unlocking direction 282 running at least approximately in the direction towards the receiving direction extent 257. The locking bar body receiving element 226, in the event of rotation in this direction, thus moves relative to the locking bar body 244, which is guided along the guide portion 262, until the locking bar body 244 is ultimately discharged from the locking bar body receptacle 224 at the receiving opening 254 and is thus released relative to the locking component 222 associated with the holding unit 30 in an unlocking position.

Due to the release of its locking component 242 with the locking bar body 244 in the unlocking state, the ball neck receiving body 32, which is arranged pivotably at the pivot axis 112 in such a way that the force of gravity acting on it acts at least approximately in the pivot direction 178 towards the working position, is normally moved out of the rest position and pivots automatically, under the action of the force of gravity, at least approximately into the working position, in this context, the term "normally" shall be understood in particular to mean that the pivotable arrangement of the ball neck receiving body 32 is constructed for its automatic pivoting from the rest position in particular until at least approximately in the working position, and in particular that the automatic pivoting occurs provided it is not prevented for example by any deliberate or other external effect or wear effect, in particular as a result of abrasion and/or soiling.

The locking component 222 associated with the holding unit 30 and having the locking bar body receiving element 226 is dimensioned in such a way that, in the unlocking state, it hinders neither the ball neck receiving body 32 nor its locking component 242 in respect of its pivoting into the working position.

It is preferably provided, as shown by way of example in FIG. 10, that the locking component 222 associated with the holding unit 30 has an initial element 286, which for example is arranged on the locking bar body receiving element 226, in particular is likewise mounted rotatably about the rotation axis 232, and for example, based on the rotation axis 232, is arranged on a side opposite the locking bar body receptacle 224 in a transverse direction thereto.

In the event that the locking bar body receiving element 226 is rotated in the unlocking direction 282, the initial element 286 also rotates with it, more specifically in particular at least approximately in the pivot direction 178 oriented towards the working position. If the bad neck receiving body remains stuck in the rest position against its normally automatic pivoting, the initial element 286, at least from an initial unlocking thrust position. In particular by means of a lug protrusion 288, thus contacts a loading point 289, for example of the bearing element 94, connected to the ball neck receiving body 32 and thus urges the ball neck receiving body 32, in particular indirectly, in the direction towards the working position. In particular, as a result of this urging, an initial static friction caused for example by wear and/or soiling and which prevents the automatic pivoting of the ball neck receiving body 32 that normally occurs is overcome, and the ball neck receiving body 32 then pivots, in particular driven by the force of gravity, at least approximately into the working position.

In this case, for example in an unlocking position firstly assumed in the unlocking state by the locking component 222 associated with the holding unit coming from the locking state, the initial element 286 is still spaced from the loading point 289, and the ball neck receiving body 32, as already explained above, could pivot from the rest position into the working position. If, however, the ball neck receiving the body 32 remains in the rest position, the initial element 286, in the event of a further rotation of the locking component 222, in the initial unlocking thrust position contacts the ball neck receiving body indirectly or directly and urges it in the direction towards the working position.

The locking component 222 associated with the holding unit 30 preferably also comprises a rotary limiter, denoted as a whole by 294, as shown by way of example in FIG. 10. The rotary limiter 294 is preferably arranged on the locking bar body receiving element 226 and allows a rotation thereof about the rotation axis 232 in the unlocking state at most as far as an unlocking end position, and for example also allows a rotation in the locking state only as far as a locking end position. To this end, the rotary limiter 294 for example has a pin-like stop body 296, which is arranged fixedly on the side part 84 in the vicinity of the rotation axis 232 and is received in a gap of a delimiting guide 298 connected to the locking bar body receiving element 226, wherein the gap extends arcuately around the rotation axis 232 between two end regions. Rotations of the locking bar body receiving element 226 and thus corresponding unlocking and locking positions thereof are thus possible, provided the stop body 296 is arranged between the two end regions of the delimiting guide 298. When one of the end regions is reached, the stop body 296 strikes against a wall portion of the delimiting guide 298 delimiting the gap, whereby a further rotation is prevented and therefore a locking end position or unlocking end position is defined.

In particular in FIG. 11, the sequence is shown of the movement from the locking device 220 in the locking state, which fixes the ball neck receiving body 32 in the rest position, to the locking device 220 in the unlocking state, in which a pivoting of the ball neck receiving body 32 positioned in the rest position in the direction towards the working position is released, and lastly the ball neck receiving body 32 pivoted into the working position with indicated pivot path of the locking bar body 244 connected thereto.

The locking bar body receiving element 226 is preferably spring-loaded in the direction towards the locking state, as outlined by way of example in FIGS. 13 and 14, so that, without any further external influence, the locking bar body receiving element 226 assumes a locking position corresponding to the locking state. FIGS. 13 and 14 only show turns of a return spring 299, which extends with two spring legs into the locking bar body receiving element and loads said element by means of these legs in the locking state.

Figure 15:
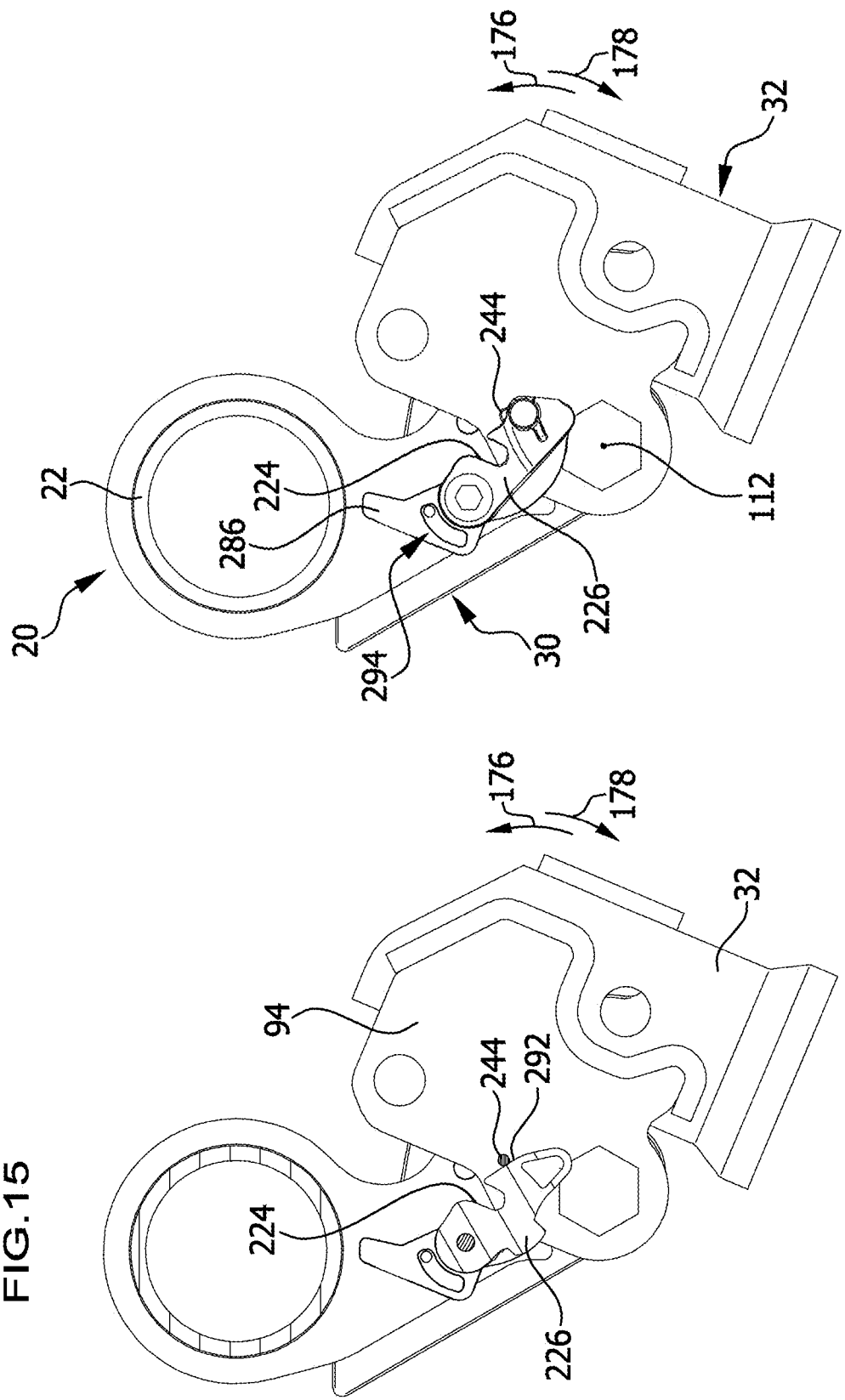
FIG. 15 shows a side representation and a partly sectional representation of the locking device when moving back into the locking state.

In order to move the locking device 220 into the locking state when the ball neck receiving body 32 is pivoted in the pivot direction 176 from the working position into the rest position, the locking bar body receiving element 226 has, on its outer side, an outer loading surface 292, which in particular is curved, as shown by way of example in FIG. 15.

The outer loading surface 292 is constructed in such a way that, as the ball neck receiving body 32 is pivoted into the rest position, the locking bar body 244, is guided in particular by means of one of its locking bar body guide surfaces 248 along this outer loading surface 292, and the locking bar body receiving element 226 is urged in the direction towards the unlocking direction 282 so that it is forced from the assumed locking position and therefore the path for the pivoting is released. The outer loading surface 292 extends as far as the receiving opening 254, so that, when the locking bar body 244 reaches the receiving opening 254, it is received by the locking bar body receptacle 224 and the locking bar body receiving element 226 is moved back into a locking position by being loaded, for example by the return spring 299. In so doing, it moves relative to the locking bar body 244, which is received along the guide portion 262 in the locking body receptacle 224, and the locking device 222 is moved into the locking state.

Figure 16:
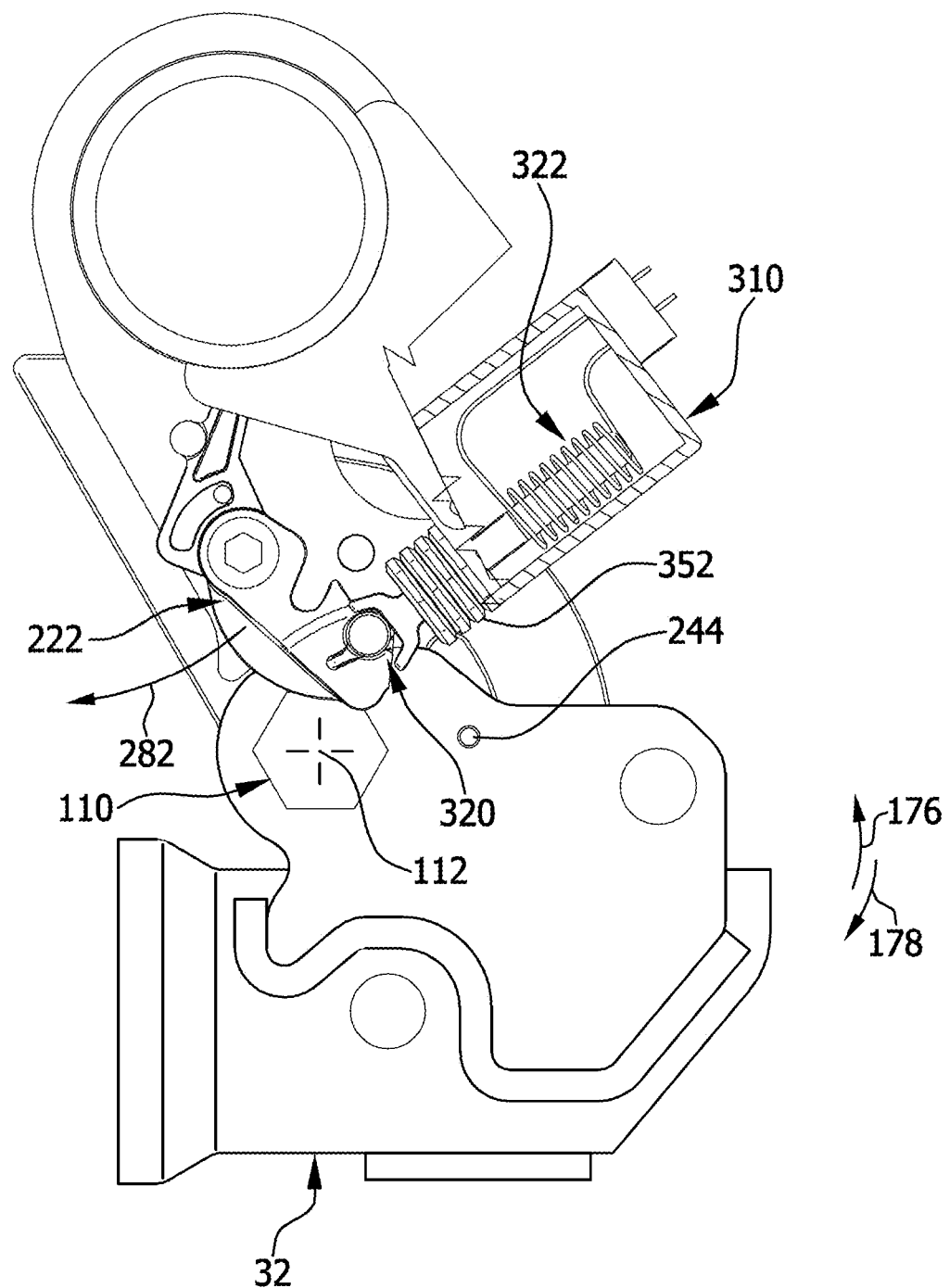
FIG. 16 shows a side representation of the trailer device with an at least partly sectional actuator housing.
Figure 17:
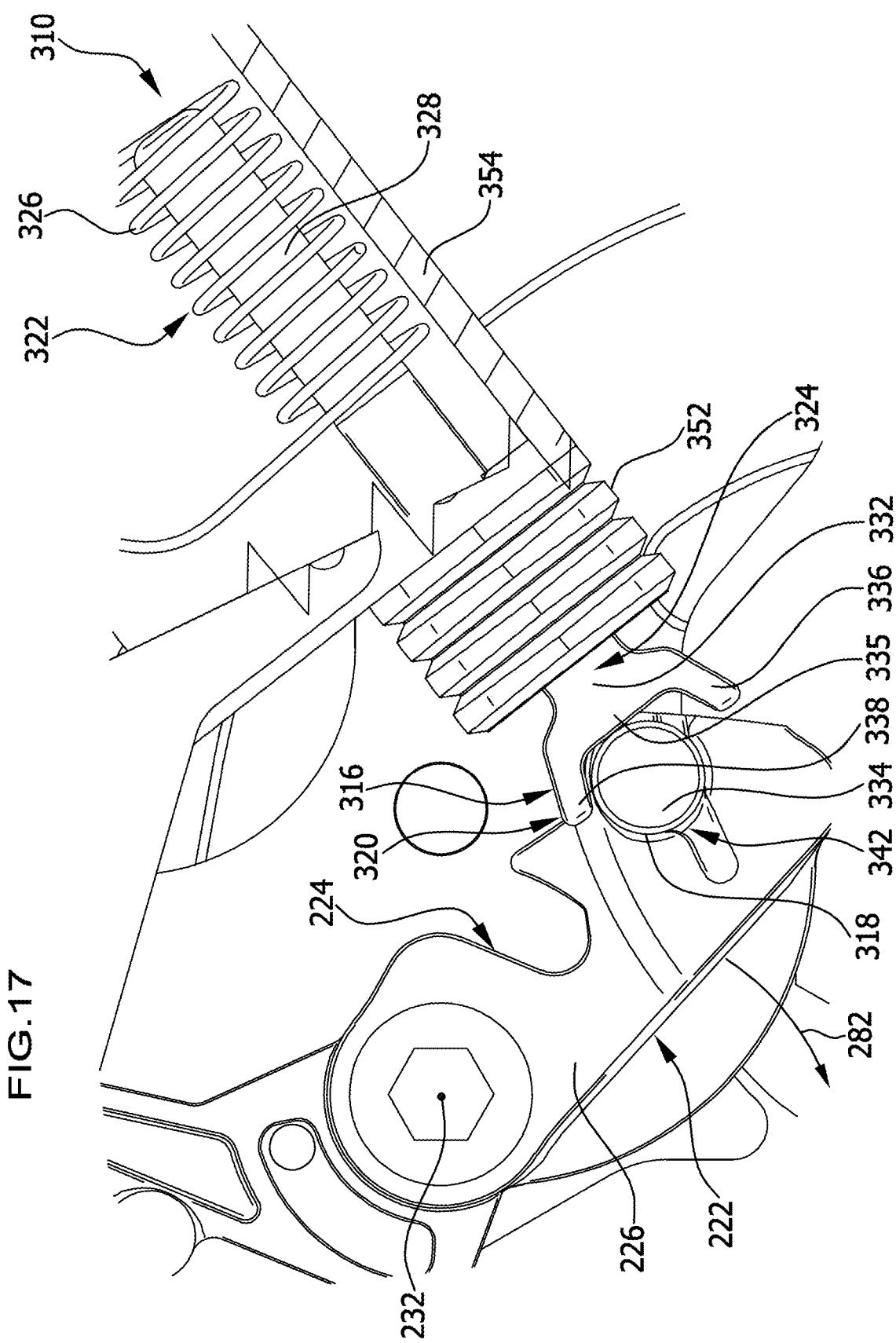
FIG. 17 shows an enlarged representation of a detail in the region of a coupling between the actuator and the locking device.

For the movement of the locking device 220 into the unlocking state, an actuator denoted as a whole by 310 and which is also shown by way of example in FIG. 16 is provided, which is coupled by means of a coupling arrangement, which is denoted as a whole by 320 and in particular comprises a coupling component 316 associated with the actuator and a coupling component 318 associated with the locking device 220, to the locking device 220, in this embodiment example to the locking component 222 associated with the holding unit 30, as is also shown by way of example in FIG. 17.

The actuator 310 comprises an actuator drive 322, which, when the actuator 310 is actuated, moves an operative actuator element 324, which by means of the coupling arrangement 320 acts in the unlocking direction 282 on the coupling component 318 associated with the locking device 220 and thus on the locking device 220.

For example, the actuator 310 is provided with a solenoid, wherein the actuator drive 322 in particular comprises a coil 326, through which a bar magnet part 328 of the operative actuator element 324 protrudes. When the actuator 310 is actuated, the magnetic field created by energizing the coil 326 acts on the bar magnet part 328, which is hereby pushed in part from the coil 326 in the direction towards the coupling component 318 associated with the locking device 220 and is pushed in the unlocking direction 282 by a positive-locking receiving part 332 of the actuator-side coupling component 316 arranged at an end of the bar magnet part 128 facing the aforementioned coupling component 318 towards a positive-locking counterpiece 334 of the corresponding coupling component 318 arranged on the locking bar body receiving element 226. When the actuator 310 is actuated, it thus moves the locking component 222 associated with the holding unit 30 into at least one unlocking position by means of the direct, in particular positive-locking coupling and in particular acts thereon as long as the actuator 310 is actuated and/or until the locking component 222 reaches an unlocking end position.

For example, the positive-locking receiving part 332 has two claws 336, 338 extending sidewards from a receiving base 335, which claws are spaced from one another and engage around the positive-locking counterpiece 334 transversely to the thrust direction of the actuator drive 322 on one side each and therefore together on both sides. The claws 336, 338 thus offer a guide for the positive-locking counterpiece 334, whereas, in particular by means of the receiving base 335, the coupling component 316 acts substantially linearly in the thrust direction on the positive-locking counterpiece 334, whereby this is moved together with the locking bar body receiving element 226 in a rotary movement about the rotation axis 232 in the unlocking direction 282.

In particular, the positive-locking counterpiece 334 is arranged on the locking bar body receiving element 226 at a coupling point 342 thereof and extends preferably in the form of a pin away therefrom and has an outer surface, which for example is substantially cylindrical and which is engaged by the positive-locking receiving part 332 and in particular can be guided by means of the claws 336, 338. In particular, the coupling point 342 is provided at an end region of the locking bar body receiving element 226 spaced from the rotation axis 232, and at least the locking bar body receptacle 224 is preferably arranged between the rotation axis 232 and the coupling point 342.

In order to move back the operative actuator element 324 once the actuator 310 has been actuated, said element is spring-loaded for example in the direction towards a starting position, for which purpose, for example, an elastic energy store 352 constructed here in the form of a bellows is provided, which under tension draws the operative actuator element 324 into the coil 326 against the thrust direction.

In particular, the starting position of the operative actuator element 324 is configured in such a way that the coupling components 316 and 318 are always coupled in the locking positions, in particular the positive-locking receiving part 332 engages around the positive-locking counterpiece 334.

In particular, the actuator drive 322 is arranged in an actuator housing 354, which has an opening through which the operative actuator element 324 protrudes, and the bellows 352 is preferably provided outside the actuator housing 354 in the region of the opening, so that said bellows also offers protection against an infiltration of particles of dirt into the interior of the actuator housing 354.

For example, the actuator housing 354 is attached to the crossmember 22 by means of an attachment element 356.

In variants, it is provided that the actuator housing 354 is for example attached to the side part 84.

For example, the actuation arrangement for the actuator 310 comprises a button, which, when actuated, causes electrical actuation transmission signals to be transmitted to the actuator drive 322 and causes said drive to be started. For example, the button is provided on the actuator housing 354.

In variants, the actuation arrangement comprises a remote controller, by means of which the actuator drive 322 can be started, wherein in particular the electrical actuation transmission signals are not transferred by cable, but by electromagnetic waves.

Figure 18:
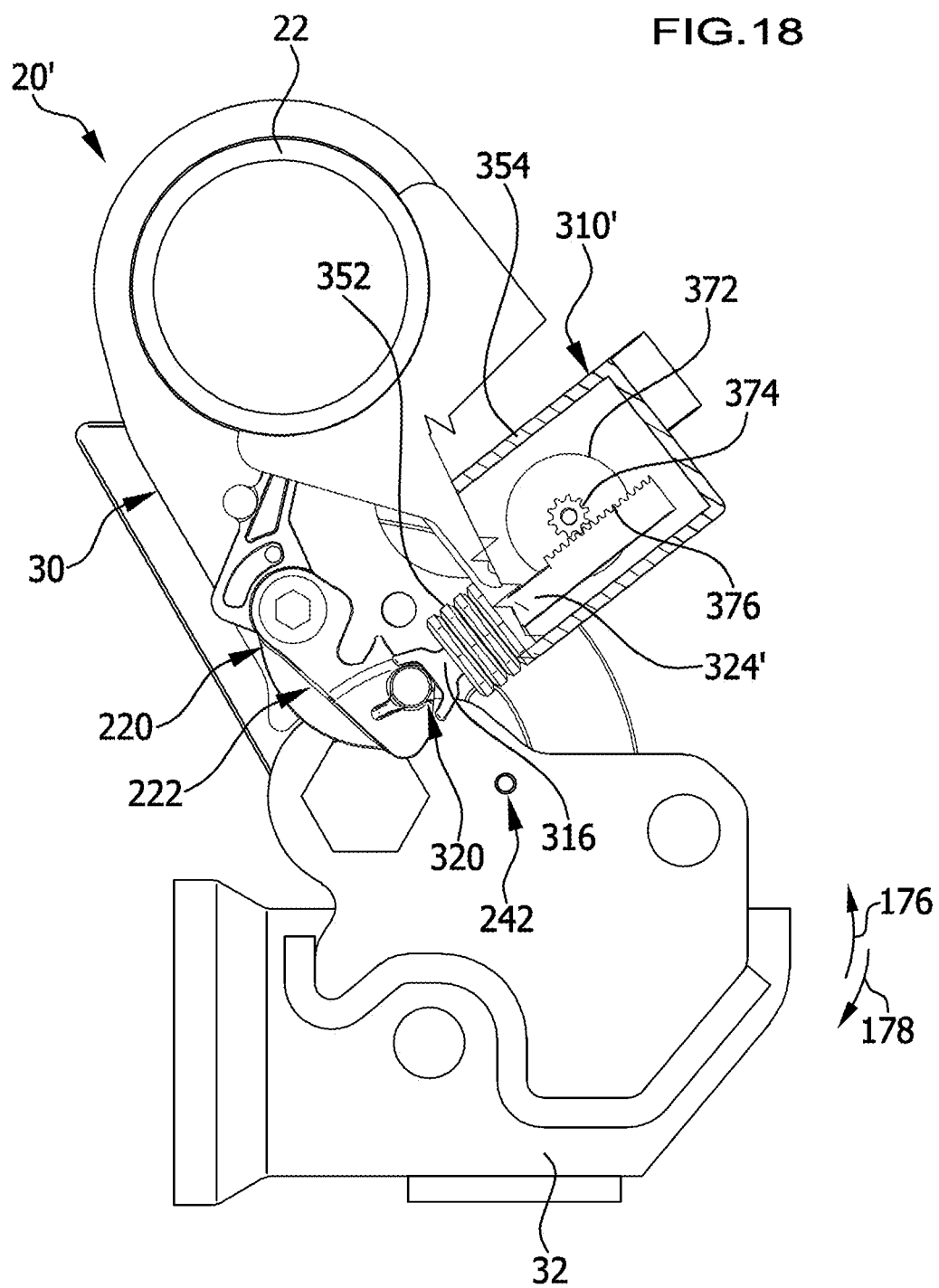
FIG. 18 shows a representation similar to that in FIG. 17 in a variant of the embodiment example with an actuator having a rack and pinion drive.

In a variant of the trailer device 20', this has an electrically operated actuator 310', which comprises a motor 372, as is shown by way of example in FIG. 18. The motor 372 cooperates by means of a gearwheel 374 with a linear, toothed portion 376 of a linearly mounted operative actuator element 324', wherein the toothed portion 376 is constructed for example as a toothed rack. The operative actuator element 324' transfers the movement converted into a linear movement to a coupling component 316 associated with the actuator 310'.

In particular, the motor 372, when the actuator 310' is actuated, rotates in an actuation direction which, as a result of the toothing, is converted into a thrust direction and is transferred by means of a coupling arrangement 320 to the locking device 220 in the form of movement in the unlocking direction 282. For example, following the end of the actuation, the motor rotates in a direction opposite to the actuation direction and in so doing moves the operative actuator element 324' into its starting position.

In variants, it is provided that, following the end of the actuation, at least the gearwheel 374 is released and the operative actuator element 324' is moved back into its starting position by means of a spring loading, for example by a bellows 352.

The bellows 352 is also expedient in order to avoid an infiltration of dirt.

In particular, the actuator 310' likewise has an actuator housing 354, which for example, as explained above, is attached to the crossmember 22 or to the holding unit 30.

For the rest, the variant of the trailer device 20' is constructed at least substantially similarly to the trailer device 20, so that reference is made fully to the descriptions provided above in relation to said trailer device.

Figure 19:
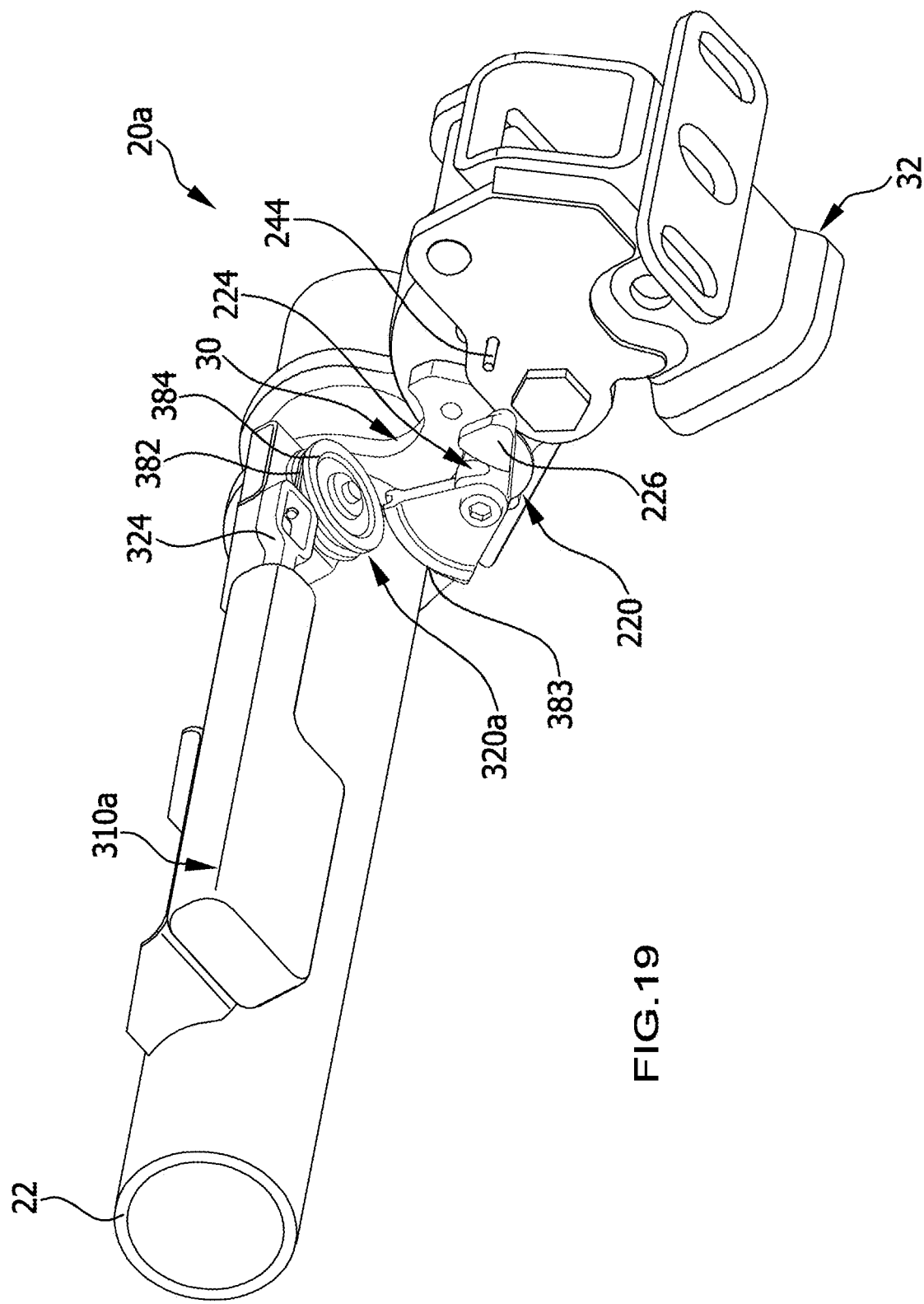
FIG. 19 shows a perspective representation of a further embodiment example with a coupling arrangement coupled between the actuator and the locking device.
Figure 20:
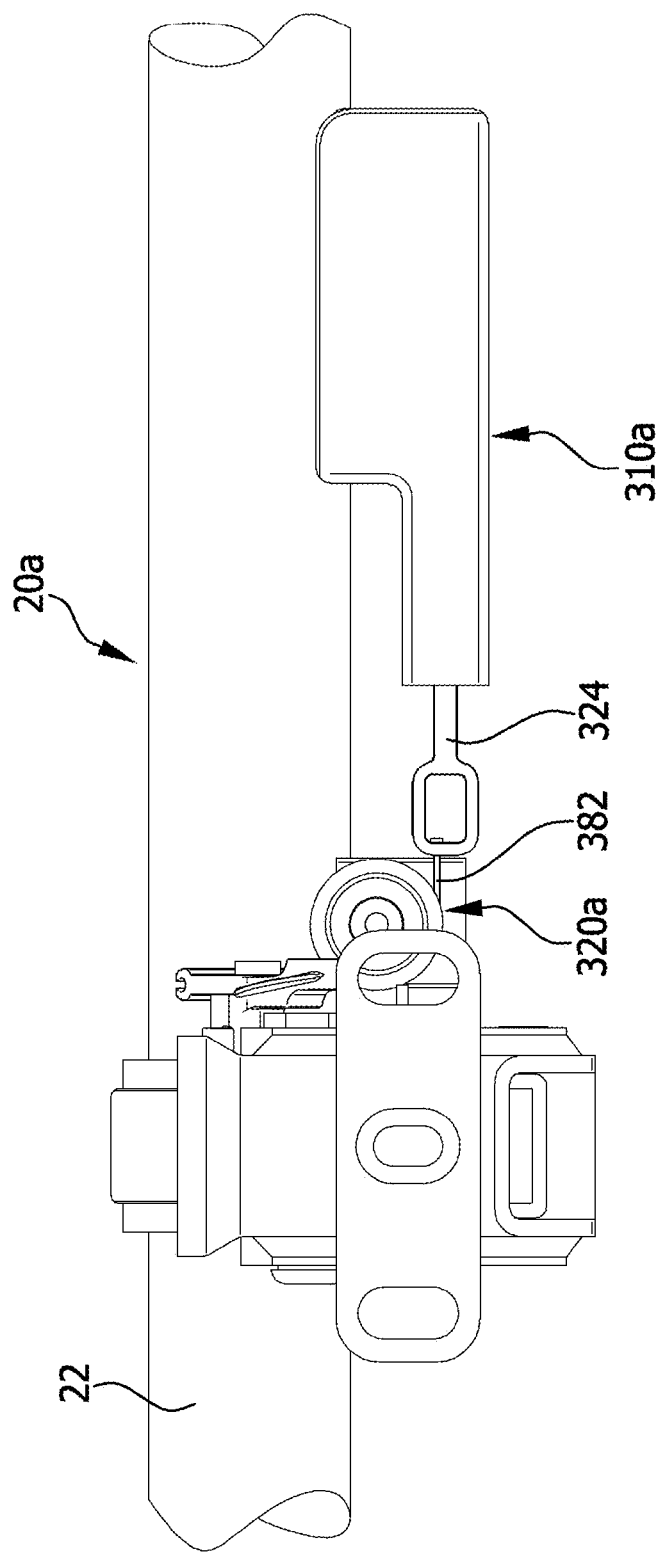
FIG. 20 shows a plan view of the trailer device with the coupling arrangement coupled in the middle.
Figure 21:
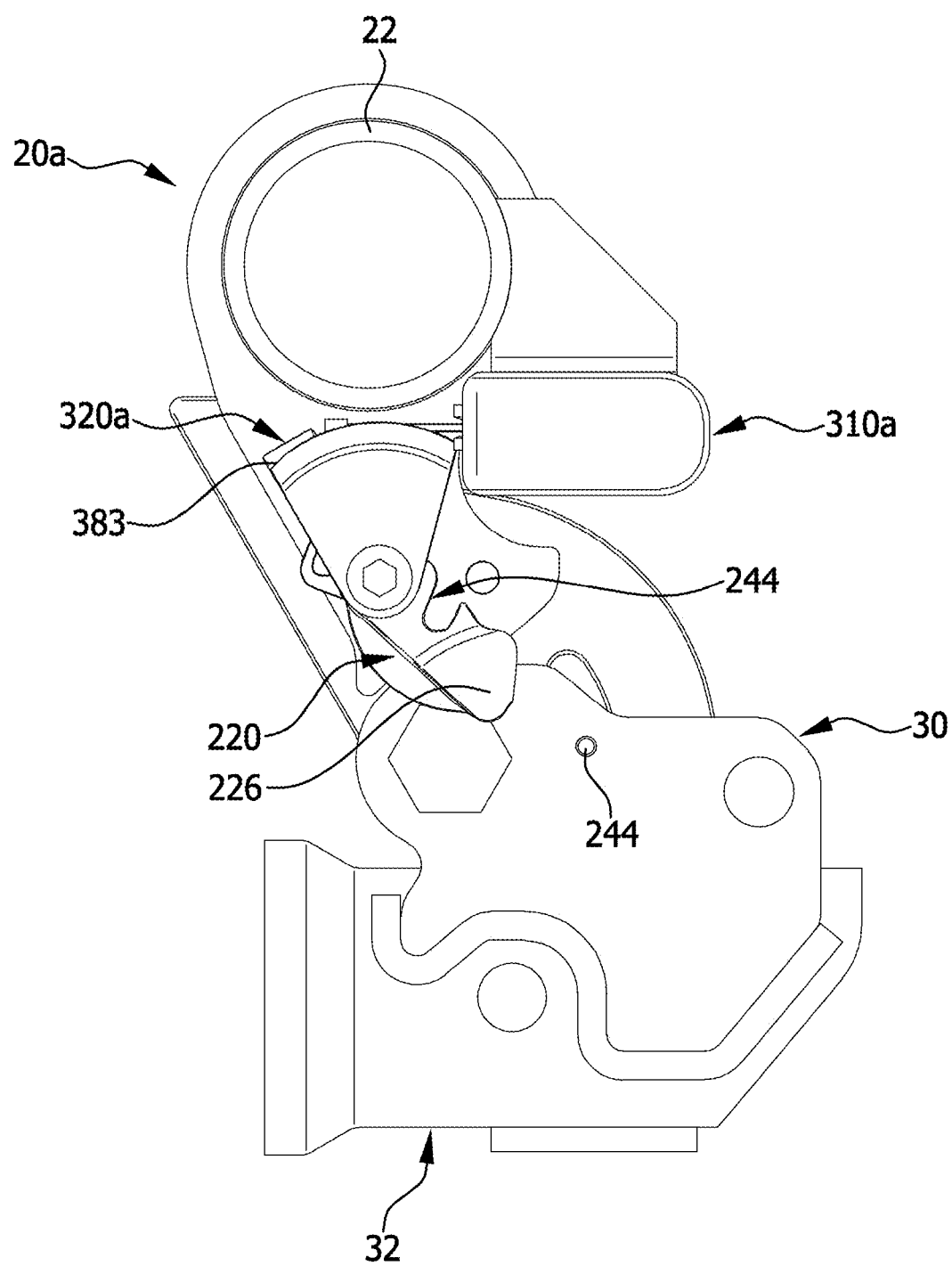
FIG. 21 shows a side representation of the trailer device with the coupling arrangement coupled in the middle.

A further embodiment example of a trailer device, which is denoted as a whole by 20a and which is shown in FIGS. 19 to 21, likewise comprises a holding unit 30 and a ball neck receiving body 32, which is arranged on the holding unit 30 so as to be pivotable between a working position and a rest position and vice versa, and also a locking device 220, by means of which, in a locking state, the ball neck receiving body 32 can be fixed and secured relative to the holding unit 30 in the rest position. In this regard, reference is made fully to the explanations provided in conjunction with the embodiment example described above.

Hereinafter, like reference signs will be used for substantially identical elements and/or such elements having an at least substantially identical basic function, and, unless stated otherwise hereinafter, reference shall be made fully to the descriptions provided in conjunction with the previous embodiment example with regard to the configuration of said elements. In the case of similar elements and/or elements having an at least fundamentally identical function, which have alternative configurations in an embodiment example hereinafter, a suffix characterizing the embodiment example will be added to the reference sign, where reference is to be made to such elements specifically.

The locking device 220 is in this embodiment example coupled to an actuator 310a arranged in particular at a spacing from the locking device, more specifically by means of a coupling arrangement 320a arranged between the locking device 220 and the actuator 310a.

For this purpose, the coupling arrangement 320a comprises a redirection member 382, which in this embodiment example is constructed as a flexible redirection member 382 and for example is a traction cable, which is arranged with one end on the operative actuator element 324 and at its other end on an element of the locking arrangement 220, in particular a pivotably mounted locking bar element.

In this embodiment example, the redirection member 382 is attached to a locking bar element 226 which has a locking bar body receptacle 224, is locked in a locking state with a locking bar body 244, and Fixes and secures the ball neck receiving body in the rest position relative to the holding unit 30. The cooperation of the locking bar body receptacle 224 and the locking bar body 244 is achieved here in particular as in the previous embodiment example, and therefore reference is made fully to the explanations provided in conjunction with said embodiment example.

In order to guide the flexible redirection member 382, a deflection pulley 384 in particular and, for example, a further guide element 385 or further guide elements 385 is provided.

In this case, the actuator 310a applies tension to the locking device 220, so that, when the actuator 310a is actuated, the operative actuator element 324 pulls on the redirection member 382 in an actuator direction of action and this movement is transferred by means of said redirection member to the locking device 220, in particular the locking bar receiving element 226, and the movement in the actuator direction of action is redirected into a movement in the unlocking direction, so that, when the actuator 310a is actuated, the locking device is moved into the unlocking state.

In particular, the locking bar element arranged on the redirection member is loaded in the direction of the locking direction, so that, when the actuation of the actuator 310a is complete, the locking bar element is moved back, as a result of the loading, into a locking position corresponding to the locking state. In particular, the flexible redirection member 382 thus always remains in a tensioned state.

The locking device is moved into the locking state as the ball neck receiving body 32 is moved into the rest position, in particular also automatically, as in the previously explained embodiment example, and therefore reference is made fully to the descriptions provided in conjunction with said embodiment example.

A further embodiment example 20b, which is shown by way of example in FIG. 22, again comprises a holding unit 30 and a ball neck receiving body 32, which is arranged on the holding unit 30 so as to be pivotable between a working position and a rest position and vice versa, as well as a locking device 220 for fixing the ball neck receiving body 32 relative to the holding unit 30 in the rest position, and an actuator 310, 310a for actuating the locking device 220. These elements and devices are constructed in particular as in one of the previously explained embodiment examples, and therefore reference is made fully to the previous explanations in this regard.

The trailer device 20b also comprises a damping device denoted as a whole by 410, by means of which a movement of the ball neck receiving body 32 from the rest position into the working position is at least partially damped.

To this end, in this embodiment example, the damping device 410 comprises an elastic damping element 412 constructed as a spring, which damping element is connected to the ball neck receiving body 32 and the holding unit 30.

For example, the damping element 412 is arranged on the bearing element 94, and in variants the elastic damping element 412 is also attached directly to the ball neck receiving body 32.

In this case, the spring 412 is arranged on the ball neck receiving body 32 and the holding unit 30 in such a way that, in the rest position of the ball neck receiving body 32, the spring is indeed held in its position, but at least is not noticeably tensioned, and therefore in the rest position and preferably also in the event of a first partial movement of the ball neck receiving body 32 from the rest position in the direction towards the working position is not tensioned, so that a departure of the ball neck receiving body 32 from the rest position is substantially unhindered by the damping element 412 constructed as a spring.

The spring, however, is arranged in such a way that in the working position of the ball neck receiving body 32 said spring is tensioned, so that at least a last partial movement of the ball neck receiving body coming from the rest position into the working position is damped in that the spring 412 is tensioned and therefore the movement of the ball neck receiving body 32 into the working position is braked, and said ball neck receiving body preferably reaches the working position gently.

For the rest, in particular at least some, preferably most of the further features and devices of the trailer device 20b are constructed as in one of the previous embodiment examples, and therefore reference is made fully to the previous explanations in this regard.

A further embodiment example of a trailer device 20c, which is shown by way of example in FIGS. 23 and 24, comprises a damping device 410c, which at least partially damps a movement of the ball neck receiving body from the rest position into the working position.

In this embodiment example, the damping device 410c comprises an elastic damping element 412c, which in particular is constructed as a rubber element.

This elastic damping element 412, constructed for example as a rubber element, is in particular arranged in such a way that, in the rest position, it does not act on the ball neck receiving body 32 or one of the elements fixedly connected thereto and pivoting together therewith, but at least protrudes into the pivot path of the ball neck receiving body or one of these elements, so that, in the event of a pivot movement of the ball neck receiving body from the rest position into the working position, said ball neck receiving body and/or one of these elements comes into contact with the damping element 412, and, in the event of a further pivoting, deforms the damping element, whereby the pivot movement is damped and braked. In this case, in this variant of this embodiment example shown in the Figures, the damping element 412 is arranged in the pivot path of the bearing element 94.

For this purpose, in particular an eccentric part 418 is provided, which is fixedly connected to the ball neck receiving body 32 and, as the latter is pivoted from the rest position into the working position, is also pivoted at the same time. In this embodiment example, the bearing element 94 forms the eccentric part 418, but in variants of the embodiment example it is provided that another element or the ball neck receiving body 32 itself forms the eccentric part 418.

As the ball neck receiving body 32 is pivoted from the rest position into the working position, the eccentric part 418 then comes into contact, as a result of its eccentric construction, with the elastic damping element 412 and damps the pivot movement. Due to the construction of the eccentricity of the part 418, the strength of the effect of the damping can expediently be set for the overall pivot movement from the rest position into the working position.

For example, it is thus possible that the damping effect in the rest position and in a first partial movement is at least not noticeably provided, and increases with increasing further pivoting in the direction towards the working position. In some variants, the damping effect increases continuously until the working position is reached. In other variants, the damping effect reaches a plateau and thus remains substantially constant until the working position is reached. In yet other variants, it is provided that the damping effect decreases again at least just before the working position is reached, and has only a slight damping effect into the working position or is even no longer effective in the working position. In the last variant, it is expedient that a pivoting of the ball neck receiving body from the working position in the direction towards the rest position is at least slightly hindered by the damping element, since the damping effect increases for a first partial movement from the working position in the direction towards the rest position, and therefore the ball neck receiving body is held at least lightly in the working position.

For the rest, in particular at least some, preferably most of the further features and elements of the trailer device 20c are constructed as in one of the previously explained embodiment examples, and therefore reference is made fully to the previous explanations in this regard.

If features of an embodiment example have not been explained explicitly, these are as constructed in another of the previously explained embodiment examples, and therefore reference is made fully in this regard to the explanation provided in conjunction with the other embodiment example.

In particular, the features and configurations of the different embodiment examples are combinable and exchangeable with one another, for example in respect of the configuration of the locking device, the actuators, the coupling arrangement and the damping devices.

The invention claimed is:

1. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein the actuator comprises an actuator drive and an operative actuator element, the operative actuator element moveable relative to the actuator drive and driven thereby.

2. The trailer device according to claim 1, wherein the ball neck receiving body is loaded by force at least in the rest position in the direction towards the working position.

3. The trailer device according to claim 2, wherein the loading with force is effective until the ball neck receiving body has reached the working position.

4. The trailer device according to claim 1, wherein the trailer device is constructed in such a way that, at least in an operating state, the ball neck receiving body is loaded by force in the direction towards the working position as a result of the effect of the force of gravity.

5. The trailer device according to claim 1, wherein the locking device comprises a locking component associated with the holding unit and a locking component associated with the ball neck receiving body.

6. The trailer device according to claim 1, wherein the locking device comprises at least one locking component loaded in the direction towards the locking state.

7. The trailer device according to claim 1, wherein the locking device is moved into the locking state as the ball neck receiving body is moved into the rest position.

8. The trailer device according to claim 1, wherein the actuator is directly coupled to the locking device.

9. The trailer device according to claim 1, wherein the ball neck receiving body is arranged mounted pivotably in such a way that, when the locking device is moved into the unlocking state, the ball neck receiving body at least normally is moved out of the rest position in the direction towards the working position.

10. The trailer device according to claim 1, wherein an initial element is provided, which initial element, in at least an unlocking position in the unlocking state, in the event of actuation of the actuator, effects an initial impulse in the direction towards the working position on the ball neck receiving body positioned in the rest position.

11. The trailer device according to claim 1, wherein the trailer device also comprises the crossmember.

12. The trailer device according to claim 1, wherein the ball neck receiving body is arranged on the holding unit so as to be freely pivotable relative thereto between the working position and the rest position.

13. The trailer device according to claim 1, wherein, at least in an operating state, the ball neck receiving body in the working position is arranged beneath the pivot axis based on the direction of the force of gravity.

14. The trailer device according to claim 1, wherein the trailer device comprises a pivot bearing unit with a bearing pin which with its longitudinal extent defines the pivot axis, and the ball neck receiving body is arranged on the bearing pin so as to be pivotable about the pivot axis.

15. The trailer device according to claim 1, wherein there is provided at least one stop element by which, in cooperation with the insertion portion of the ball neck inserted into the ball neck receptacle, the ball neck receiving body is fixed together with the inserted insertion portion non-rotatably about the pivot axis.

16. A motor vehicle comprising the trailer device according to claim 1 in combination with a vehicle body.

17. A trailer device of claim 1, wherein the actuator is an electrical actuator.

18. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein the locking device comprises a locking component having a locking bar body receptacle and a locking component having a locking bar body, wherein the locking bar body is received in the locking bar body receptacle in at least one locking position of the unlocking state and their relative position in relation to one another is thus fixed.

19. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein the actuator comprises an actuator drive and an operative actuator element, wherein, when the actuator is actuated, the actuator drive moves the operative actuator element, and the operative actuator element acts on the locking device, thus moving the locking device into the unlocking state.

20. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein the actuator comprises an actuator drive and wherein the actuator drive is not self-locking and/or is loaded in the direction towards a starting position.

21. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein a coupling arrangement is coupled to the actuator and the locking device and is arranged between them.

22. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein the trailer device comprises a damping device for at least partially damping a movement of the ball neck receiving body into the working position.

23. The trailer device according to claim 22, wherein the damping device does not act in a damping manner on the ball neck receiving body in at least one situation of the situation when the ball neck receiving body is in the rest position and the situation at the start of the movement of the ball neck receiving body from the rest position into the working position.

24. The trailer device according to claim 22, wherein, at least during part of the movement of the ball neck receiving body from the rest position into the working position, the damping effect of the damping device on the movement of the ball neck receiving body becomes greater with increasing proximity of the ball neck receiving body to the working position.

25. The trailer device according to claim 22, wherein the damping device comprises an elastic damping element.

26. A motor vehicle comprising the trailer device according to claim 22 in combination with a vehicle body.

27. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein the actuator comprises an actuator drive and wherein an actuation arrangement for actuating the actuator drive, when actuated, sends an electrical actuation signal to the actuator drive for actuation thereof.

28. A trailer device for motor vehicles, comprising a holding unit for a crossmember mountable on a vehicle body on the rear-end side thereof and a ball neck receiving body having a ball neck receptacle, in which an insertion portion of a ball neck supporting a coupling ball is insertable and fixable therein, wherein the ball neck receiving body is arranged mounted on the holding unit so as to be pivotable at least between a working position, in which a ball neck is insertable with its insertion portion into the ball neck receptacle, and a rest position, wherein the trailer device comprises a locking device which fixes the ball neck receiving body in the rest position in a locking state relative to the holding unit and has an unlocking state, in which the locking device allows the ball neck receiving body to pivot from the rest position in the direction towards the working position, and wherein an actuator is provided, by which the locking device is movable from the locking state into the unlocking state, wherein said trailer device comprises a sensor which is constructed to detect whether the ball neck is inserted with the insertion portion in the ball neck receptacle of the ball neck receiving body positioned in the working position at least over a minimal extent necessary to fix the ball neck in the ball neck receptacle.

29. The trailer device according to claim 28, wherein the insertion portion inserted at least over the minimal extent at least contributes to a blocking of the pivoting of the ball neck receiving body from the working position in at least one pivot direction.

30. The trailer device according to claim 28, wherein the insertion portion inserted at least over the minimal extent is inserted sufficiently far into the ball neck receptacle for a fixing in at least an insertion direction by a fixing device.

31. The trailer device according to claim 28, wherein the sensor is arranged behind at least one stop element based on a direction of insertion of the insertion portion.

32. A motor vehicle comprising the trailer device according to claim 28 in combination with a vehicle body.

* * * * *